(12) United States Patent
Davies et al.

(10) Patent No.: US 10,633,534 B2
(45) Date of Patent: Apr. 28, 2020

(54) DOWNHOLE TOOL AND METHODS OF USE

(71) Applicant: Downhole Technology, LLC, Houston, TX (US)

(72) Inventors: Evan Lloyd Davies, Houston, TX (US); Duke Vanlue, Tomball, TX (US); Yanan Hou, Houston, TX (US); Liguo Li, Houston, TX (US); David Hughes, Houston, TX (US)

(73) Assignee: The WellBoss Company, LLC, Houston, TX (US)

( * ) Notice: Subject to any disclaimer, the term of this patent is extended or adjusted under 35 U.S.C. 154(b) by 0 days.

(21) Appl. No.: 15/784,020

(22) Filed: Oct. 13, 2017

(65) Prior Publication Data
US 2018/0038191 A1 Feb. 8, 2018

Related U.S. Application Data

(63) Continuation of application No. PCT/US2017/040614, filed on Jul. 13, 2017.
(Continued)

(51) Int. Cl.
*E21B 23/01* (2006.01)
*C08L 63/00* (2006.01)
*C08K 3/34* (2006.01)
*C08K 7/20* (2006.01)
*E21B 33/124* (2006.01)
*E21B 33/128* (2006.01)
(Continued)

(52) U.S. Cl.
CPC .............. *C08L 63/00* (2013.01); *C08K 3/346* (2013.01); *C08K 7/20* (2013.01); *E21B 23/01* (2013.01); *E21B 33/124* (2013.01); *E21B 33/128* (2013.01); *E21B 33/1293* (2013.01); *E21B 33/134* (2013.01); *E21B 33/12* (2013.01)

(58) Field of Classification Search
CPC ............................ E21B 23/01; E21B 33/1293
USPC ........................................................ 166/376
See application file for complete search history.

(56) References Cited

U.S. PATENT DOCUMENTS 2,230,712 A   2/1941  Bendeler et al.
2,683,492 A   7/1954  Baker
(Continued)

FOREIGN PATENT DOCUMENTS

EP   0504848   9/1992
EP   0890706   1/1993
(Continued)

OTHER PUBLICATIONS

International Preliminary Report on Patentability, PCT/US2012/051938, 6 pages, dated Feb. 25, 2014.
(Continued)

*Primary Examiner* — Taras P Bemko
(74) *Attorney, Agent, or Firm* — Rao DeBoer Osterrieder, PLLC; John M. DeBoer

(57) ABSTRACT

A downhole tool suitable for use in a wellbore, the tool comprising a hybrid sleeve in the form of a mandrel sleeve; and a sleeve insert disposed within the mandrel sleeve. The tool further includes a first slip disposed about the mandrel sleeve; and a second slip disposed about the mandrel sleeve and proximate to a conical surface. There is a lower sleeve proximate to the second slip. At least a portion of the sleeve insert is radially laterally proximate to a sealing element disposed around the mandrel.

20 Claims, 7 Drawing Sheets

Related U.S. Application Data

(60) Provisional application No. 62/439,085, filed on Dec. 26, 2016, provisional application No. 62/358,230, filed on Jul. 5, 2016.

(51) Int. Cl.
*E21B 33/129* (2006.01)
*E21B 33/134* (2006.01)
*E21B 33/12* (2006.01)

(56) References Cited

U.S. PATENT DOCUMENTS

| | | |
|---|---|---|
| 2,797,758 A | 7/1957 | Showalter |
| 3,163,225 A | 12/1964 | Perkins |
| 3,343,607 A | 9/1967 | Current |
| 3,422,898 A | 1/1969 | Conrad |
| 3,687,196 A | 8/1972 | Mullins |
| 3,769,127 A | 10/1973 | Goldsworthy et al. |
| 3,776,561 A | 12/1973 | Haney |
| 4,359,090 A | 11/1982 | Luke |
| 4,388,971 A | 6/1983 | Peterson |
| 4,436,150 A | 3/1984 | Barker |
| 4,437,516 A | 3/1984 | Cockrell |
| 4,440,223 A | 4/1984 | Akkerman |
| 4,469,172 A | 9/1984 | Clark |
| 4,711,300 A | 12/1987 | Wardlaw et al. |
| 4,784,226 A | 11/1988 | Wyatt |
| 5,025,858 A | 6/1991 | Glaser |
| 5,048,606 A | 9/1991 | Allwin |
| 5,113,940 A | 5/1992 | Glaser |
| 5,147,857 A | 9/1992 | Raddatz et al. |
| 5,224,540 A | 7/1993 | Streich et al. |
| 5,246,069 A | 9/1993 | Glaser et al. |
| 5,253,714 A | 10/1993 | Davis et al. |
| 5,333,685 A | 8/1994 | Gilbert |
| 5,376,200 A | 12/1994 | Hall |
| 5,449,040 A | 9/1995 | Milner |
| 5,484,040 A | 1/1996 | Penisson |
| 5,819,846 A | 10/1998 | Bolt et al. |
| 5,839,515 A | 11/1998 | Yuan et al. |
| 5,842,517 A | 12/1998 | Coone |
| 5,927,403 A | 7/1999 | Dallas |
| 5,967,352 A | 10/1999 | Repp |
| 5,984,007 A | 11/1999 | Yuan |
| 6,167,963 B1 | 1/2001 | McMahan et al. |
| 6,241,018 B1 | 6/2001 | Eriksen |
| 6,353,771 B1 | 3/2002 | Southland |
| 6,354,372 B1 | 3/2002 | Carisella et al. |
| 6,425,442 B1 | 7/2002 | Latiolais et al. |
| 6,491,116 B2 | 12/2002 | Berscheidt et al. |
| 6,578,638 B2 | 6/2003 | Guillory |
| 6,708,768 B2 | 3/2004 | Slup et al. |
| 6,712,153 B2 | 3/2004 | Turley et al. |
| 6,899,181 B2 | 5/2005 | Simpson et al. |
| 7,044,230 B2 | 5/2006 | Starr et al. |
| 7,087,109 B2 | 8/2006 | Bredt et al. |
| 7,093,664 B2 | 8/2006 | Todd et al. |
| 7,255,178 B2 | 8/2007 | Slup et al. |
| 7,350,569 B2 | 4/2008 | Collins et al. |
| 7,350,582 B2 | 4/2008 | McKeachnie et al. |
| 7,475,736 B2 | 1/2009 | Lehr et al. |
| 7,484,940 B2 | 2/2009 | O'Neill |
| 7,735,549 B1 | 6/2010 | Nish et al. |
| 7,740,079 B2 | 6/2010 | Clayton et al. |
| 7,753,416 B2 | 7/2010 | Mazzaferro et al. |
| 7,762,323 B2 | 7/2010 | Frazier |
| 7,980,300 B2 | 7/2011 | Roberts et al. |
| 8,002,030 B2 | 8/2011 | Turley et al. |
| 8,016,295 B2 | 9/2011 | Guest et al. |
| 8,079,413 B2 | 12/2011 | Frazier |
| 8,113,276 B2 | 2/2012 | Greenlee et al. |
| 8,127,851 B2 | 3/2012 | Misselbrook |
| 8,167,033 B2 | 5/2012 | White |
| 8,205,671 B1 | 6/2012 | Branton |
| 8,211,248 B2 | 7/2012 | Marya |
| 8,231,947 B2 | 7/2012 | Vaidya et al. |
| 8,267,177 B1 | 9/2012 | Vogel et al. |
| D673,182 S | 12/2012 | Frazier |
| 8,336,616 B1 | 12/2012 | McClinton |
| 8,381,809 B2 | 2/2013 | White |
| 8,459,346 B2 | 6/2013 | Frazier |
| 8,469,088 B2 | 6/2013 | Shkurti et al. |
| 8,567,492 B2 | 10/2013 | White |
| 8,596,347 B2 | 12/2013 | Valencia et al. |
| 8,839,855 B1 | 2/2014 | McClinton et al. |
| 8,770,276 B1 | 7/2014 | Nish et al. |
| 8,770,280 B2 | 7/2014 | Buytaert et al. |
| 8,887,818 B1 | 11/2014 | Carr et al. |
| 8,893,780 B2 | 11/2014 | Greenlee et al. |
| 9,416,617 B2 | 8/2016 | Wiese et al. |
| 9,708,878 B2 | 7/2017 | Cooke, Jr. |
| 9,714,551 B2 | 7/2017 | Okura et al. |
| 9,790,763 B2 | 10/2017 | Fripp et al. |
| D806,136 S | 12/2017 | Saulou et al. |
| 9,845,658 B1 | 12/2017 | Nish et al. |
| 9,982,506 B2 | 5/2018 | Walton et al. |
| 2003/0188876 A1 | 10/2003 | Vick et al. |
| 2003/0226660 A1 | 12/2003 | Winslow et al. |
| 2003/0236173 A1 | 12/2003 | Dobson et al. |
| 2004/0003928 A1 | 1/2004 | Frazier |
| 2004/0045723 A1 | 3/2004 | Slup et al. |
| 2004/0216868 A1 | 11/2004 | Owen, Sr. |
| 2005/0183864 A1 | 8/2005 | Trinder |
| 2005/0194141 A1* | 9/2005 | Sinclair .......... C09K 8/805 166/280.2 |
| 2006/0243455 A1 | 11/2006 | Telfer |
| 2007/0039742 A1 | 2/2007 | Costa |
| 2007/0119600 A1 | 5/2007 | Slup et al. |
| 2008/0128133 A1 | 6/2008 | Turley et al. |
| 2008/0196879 A1 | 8/2008 | Broome et al. |
| 2008/0264627 A1 | 10/2008 | Roberts et al. |
| 2008/0277162 A1 | 11/2008 | DiFoggio |
| 2009/0038790 A1 | 2/2009 | Barlow |
| 2009/0090516 A1 | 4/2009 | Delucia et al. |
| 2009/0229424 A1 | 9/2009 | Montgomery |
| 2009/0236091 A1 | 9/2009 | Hammami et al. |
| 2010/0155050 A1 | 6/2010 | Frazier |
| 2010/0263876 A1 | 10/2010 | Frazier |
| 2010/0276159 A1 | 11/2010 | Mailand et al. |
| 2010/0326660 A1 | 12/2010 | Ballard et al. |
| 2011/0024134 A1 | 2/2011 | Buckner |
| 2011/0048740 A1 | 3/2011 | Ward et al. |
| 2011/0048743 A1 | 3/2011 | Stafford et al. |
| 2011/0088891 A1 | 4/2011 | Stout |
| 2011/0094802 A1 | 4/2011 | Vatne |
| 2011/0186306 A1 | 8/2011 | Marya et al. |
| 2011/0232899 A1 | 9/2011 | Porter |
| 2011/0259610 A1 | 10/2011 | Shkurti et al. |
| 2011/0277989 A1 | 11/2011 | Frazier |
| 2011/0290473 A1 | 12/2011 | Frazier |
| 2012/0061105 A1 | 3/2012 | Neer et al. |
| 2012/0125642 A1 | 5/2012 | Chenault et al. |
| 2012/0181032 A1 | 7/2012 | Naedler et al. |
| 2012/0234538 A1 | 9/2012 | Martin et al. |
| 2012/0279700 A1 | 11/2012 | Frazier |
| 2013/0032357 A1 | 2/2013 | Mazyar et al. |
| 2013/0048271 A1* | 2/2013 | VanLue .......... E21B 33/128 166/118 |
| 2013/0098600 A1 | 4/2013 | Roberts |
| 2013/0240201 A1 | 9/2013 | Frazier |
| 2013/0306331 A1 | 11/2013 | Bishop et al. |
| 2014/0020911 A1 | 1/2014 | Martinez |
| 2014/0027127 A1 | 1/2014 | Frazier et al. |
| 2014/0045731 A1 | 2/2014 | Daccord |
| 2014/0090831 A1 | 4/2014 | Young et al. |
| 2014/0116677 A1 | 5/2014 | Sherlin |
| 2014/0120346 A1 | 5/2014 | Rochen |
| 2014/0190685 A1* | 7/2014 | Frazier .......... E21B 33/1208 166/250.01 |
| 2014/0224476 A1 | 8/2014 | Frazier |
| 2014/0345875 A1 | 11/2014 | Murphree et al. |
| 2014/0345878 A1 | 11/2014 | Murphree et al. |
| 2014/0374163 A1 | 12/2014 | Rui et al. |

(56) References Cited

U.S. PATENT DOCUMENTS

| | | |
|---|---|---|
| 2015/0013996 A1 | 1/2015 | Davies et al. |
| 2015/0068728 A1 | 3/2015 | Stage et al. |
| 2015/0083394 A1 | 3/2015 | Skarsen et al. |
| 2015/0144348 A1 | 5/2015 | Okura et al. |
| 2015/0239795 A1 | 8/2015 | Doud et al. |
| 2015/0252638 A1 | 9/2015 | Richards et al. |
| 2015/0275070 A1 | 10/2015 | Getzlaf et al. |
| 2015/0354313 A1 | 12/2015 | McClinton et al. |
| 2015/0368994 A1 | 12/2015 | Mhaskar et al. |
| 2016/0115759 A1* | 4/2016 | Richards ............... E21B 33/134 166/378 |
| 2016/0122617 A1 | 5/2016 | Murphree et al. |
| 2016/0123104 A1 | 5/2016 | Harris |
| 2016/0130906 A1 | 5/2016 | Garvey et al. |
| 2016/0160591 A1 | 6/2016 | Xu et al. |
| 2016/0201427 A1 | 7/2016 | Fripp et al. |
| 2016/0265305 A1 | 9/2016 | Davies et al. |
| 2016/0281458 A1 | 9/2016 | Greenlee |
| 2016/0305215 A1 | 10/2016 | Harris et al. |
| 2017/0044859 A1 | 2/2017 | Blair |
| 2017/0183950 A1 | 6/2017 | Gillis et al. |
| 2017/0260824 A1 | 9/2017 | Kellner et al. |
| 2017/0260825 A1 | 9/2017 | Schmidt et al. |
| 2017/0284167 A1 | 10/2017 | Takahashi et al. |
| 2017/0321514 A1 | 11/2017 | Crow |

FOREIGN PATENT DOCUMENTS

| | | |
|---|---|---|
| EP | 1643602 | 4/2006 |
| WO | 2007014339 | 2/2007 |
| WO | 2008100644 | 8/2008 |
| WO | 20091128853 | 9/2009 |
| WO | 2011097091 | 8/2011 |
| WO | 2016032761 | 3/2016 |
| WO | 2016182545 | 11/2016 |

OTHER PUBLICATIONS

International Search Report, PCT/US2012/051938, 3 pages, dated Jan. 3, 2013.

International Preliminary Report on Patentability, PCT/US2012/051940, 6 pages, dated Feb. 25, 2014.

Written Opinion dated Jan. 3, 2013 for Intl App No. PCT/US2012/051938 (5 pages).

Search Report and Written Opinion dated Feb. 21, 2013 for Intl App No. PCT/US2012/051936 (9 pages).

Search Report and Written Opinion dated Feb. 27, 2013 for Intl App No. PCT/US2012/051940 (10 pages).

Search Report dated Mar. 11, 2013 for Intl App No. PCT/US2012/051934 (3 pages).

Lehr et al., "Best Practices for Multizone Isolation Using Composite Plugs," Society of Petroleum Engineers, SPE 142744 ConocoPhillips and Baker Hughes Conference Paper, dated Jun. 8, 2011 (40 pgs).

International Preliminary Report on Patentability, PCT/US2012/051934, 6 pages, dated Feb. 25, 2014.

International Preliminary Report on Patentability, PCT/US2012/051936, 5 pages, dated Feb. 25, 2014.

Search Report dated Feb. 27, 2013 for Intl App No. PCT/US2012/051940 (3 pages).

Search Report dated Feb. 21, 2013 for Intl App No. PCT/US2012/051936 (3 pages).

Search Report and Written Opinion dated Mar. 11, 2013 for Intl App No. PCT/US2012/051934 (10 pages).

* cited by examiner

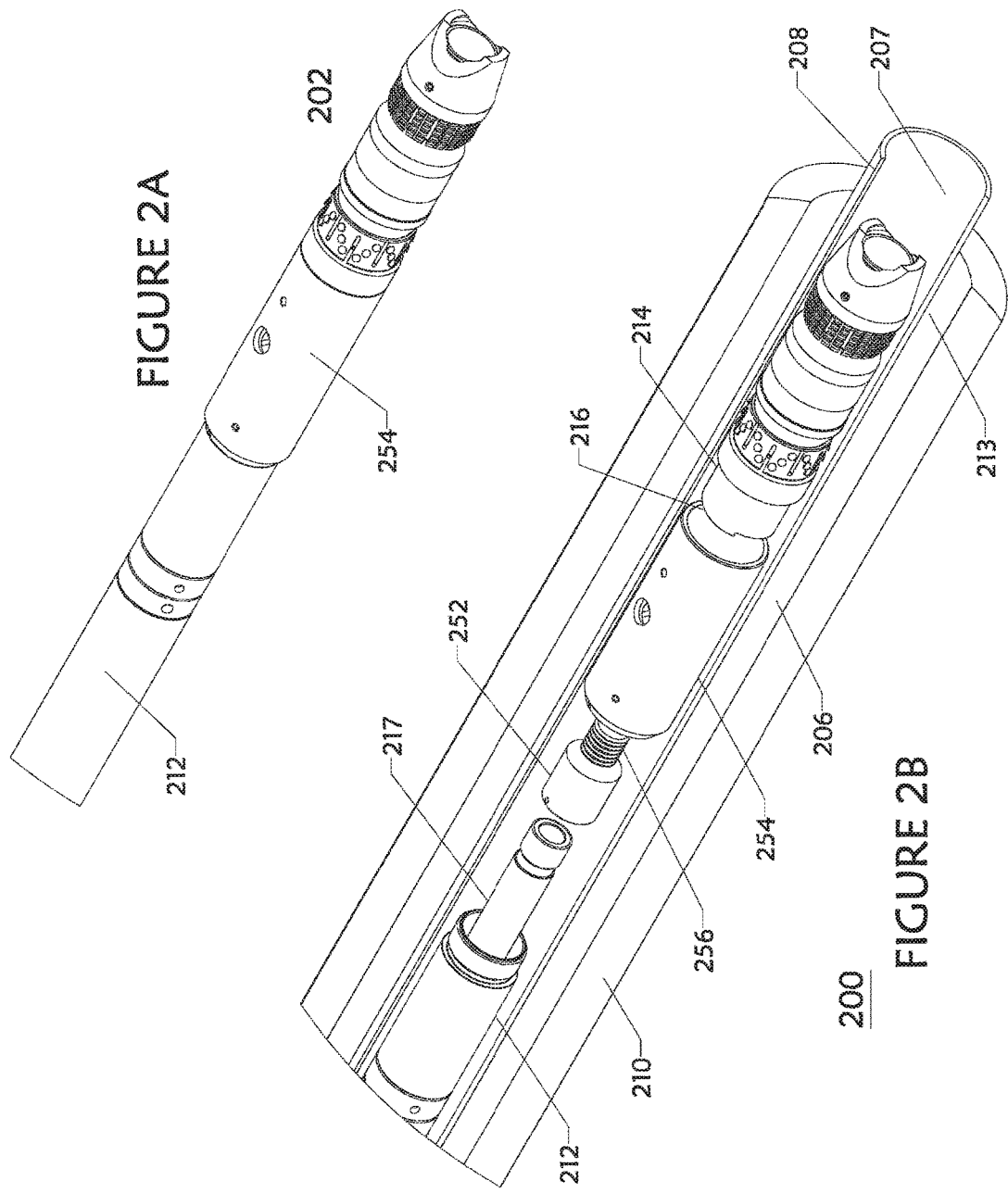

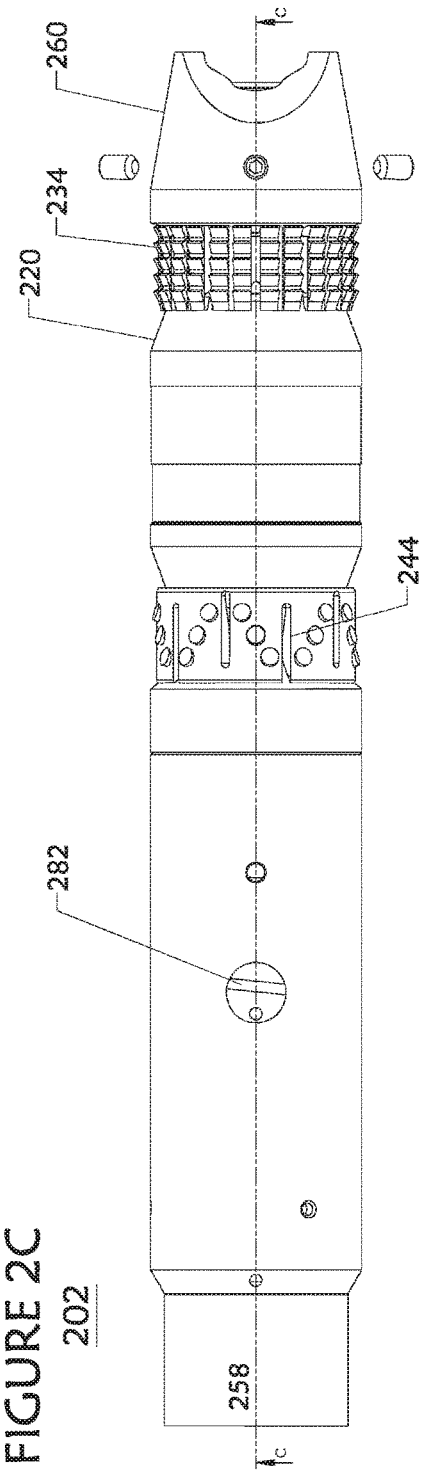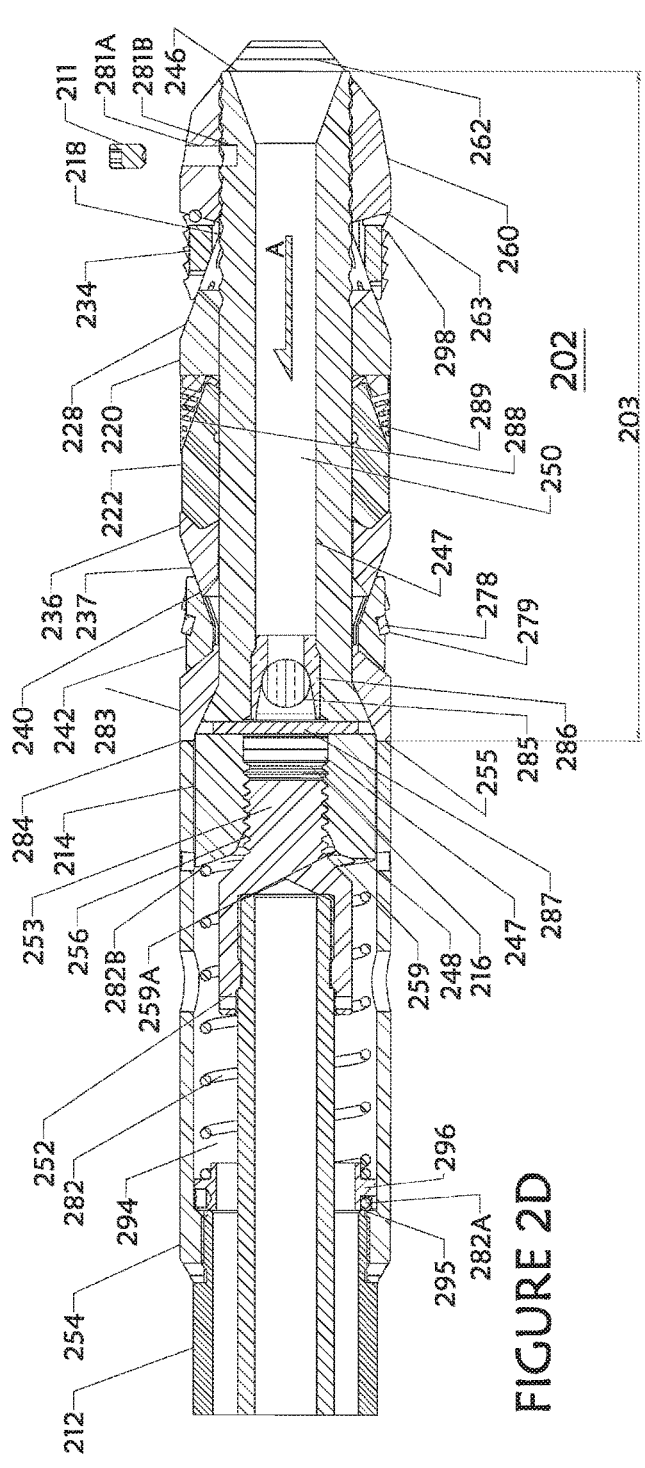

DOWNHOLE TOOL AND METHODS OF USE

CROSS-REFERENCE TO RELATED APPLICATIONS

This application is a bypass continuation of PCT Application Ser. No. PCT/US17/40614, filed on Jul. 3, 2017, which claims benefit of U.S. Provisional Patent Application Ser. Nos. 62/439,085, filed on Dec. 26, 2016, and 62/358,230, filed on Jul. 5, 2016. The disclosure of each application is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure generally relates to systems and related tools used in oil and gas wellbores. Certain embodiments pertain to a composition of matter useable with systems, related tools, and parts thereof. Particular embodiments of the disclosure pertain to a breakable, dissolvable, disassociatable, and/or degradable material. Some embodiments include a device of component of a downhole tool made of a material(s) having a composition of about 100 parts by weight of a resin system that includes an epoxy resin with an anhydride hardener; about 10-20 parts by weight of an additive that may be a clay-based constituent; about 20-30 parts by weight of a fiber; and about 5-10 parts by weight of a glass. The epoxy resin may be a low viscosity cycloaliphatic epoxy resin.

Background of the Disclosure

An oil or gas well includes a wellbore extending into a subterranean formation at some depth below a surface (e.g., Earth's surface), and is usually lined with a tubular, such as casing, to add strength to the well. Many commercially viable hydrocarbon sources are found in "tight" reservoirs, which means the target hydrocarbon product may not be easily extracted. The surrounding formation (e.g., shale) to these reservoirs typically has low permeability, and it is uneconomical to produce the hydrocarbons (i.e., gas, oil, etc.) in commercial quantities from this formation without the use of drilling accompanied with additional operations.

Fracing is common in the industry and includes the use of a plug set in the wellbore below or beyond the respective target zone, followed by pumping or injecting high pressure frac fluid into the zone. A frac plug and accompanying operation may be such as described or otherwise disclosed in U.S. Pat. No. 8,955,605, incorporated by reference herein in its entirety for all purposes.

Still, downhole operations may include the use of any number of other devices, tools, etc. (or collectively in general a "tool" or "tools") including drill bits, flow controllers, packers, plugs, sliding sleeves, related tubing, and more. Some tools may be characterized as having complex mechanical designs, and often require remote control or actuation from the surface via wirelines, hydraulic control lines, coil tubings, and so forth. Other methods of actuation include pressurization, which may occur by sliding a sleeve or dropping a ball in order to block or otherwise obstruct an orifice in the tool.

Downhole tools typically have multiple components constructed of steel, cast iron, aluminum, or other alloyed metals. Additionally or alternatively, tool components may include composite or rubber materials.

It is naturally desirable to "flow back," i.e., from the formation to the surface, the injected fluid, or the formation fluid(s); however, this is not possible until the previously set tool or its blockage is removed. Removal of tools (or blockage) usually requires a well-intervention service for retrieval or drill-through, which is time consuming, costly, and adds a potential risk of wellbore damage.

The more metal parts used in the tool, the longer the drill-through operation takes. Because metallic components are harder to drill, such an operation may require additional trips into and out of the wellbore to replace worn out drill bits.

In the interest of cost-saving, materials that react under certain downhole conditions have been the subject of significant research in view of the potential offered to the oilfield industry. For example, such an advanced material that has an ability to degrade by mere response to a change in its surrounding is desirable because no, or limited, intervention would be necessary for removal or actuation to occur.

Such a material, essentially self-actuated by changes in its surrounding (e.g., the presence a specific fluid, a change in temperature, and/or a change in pressure, etc.) may potentially replace costly and complicated designs and may be most advantageous in situations where accessibility is limited or even considered to be impossible, which is the case in a downhole (subterranean) environment.

It is highly desirable and economically advantageous to have controls that do not rely on lengthy and costly wirelines, hydraulic control lines, or coil tubings. Furthermore, in countless situations, a subterranean piece of equipment may need to be actuated only once, after which it may no longer present any usefulness, and may even become disadvantageous when for instance the equipment must be retrieved by risky and costly interventions.

In some instances, it may be advantageous to have a device (ball, tool, component, etc.) made of a material (of composition of matter) characterized by properties where the device is mechanically strong (hard) under some conditions (such as at the surface or at ambient conditions), but degrades, dissolves, breaks, etc. under specific conditions, such as in the presence of water-containing fluids like fresh water, seawater, formation fluid, additives, brines, acids and bases, or changes in pressure and/or temperature. Thus, after a predetermined amount of time, and after the desired operation(s) is complete, the formation fluid is ultimately allowed to flow toward the surface.

It would be advantageous to configure a device (or a related activation device, such as a frac ball, or other component(s)) to utilize materials that alleviate or reduce the need for an intervention service. This would save a considerable amount of time and expense. Therefore, there is a need in the art for tools, devices, components, etc. to be of a nature that does not involve or otherwise require a drill-through process. Environmental- or bio-friendly materials are further desirous.

The ability to save operational time (and those saving operational costs) leads to considerable competition in the marketplace. Achieving any ability to save time, or ultimately cost, leads to an immediate competitive advantage.

SUMMARY

Embodiments of the disclosure pertain to a downhole tool in a wellbore, the tool including a mandrel sleeve; and a sleeve insert disposed within the mandrel sleeve. The tool may include a first slip disposed about the mandrel sleeve. The tool may include a second slip disposed about the mandrel sleeve. The second slip may be proximate to a conical surface. The tool may include a lower sleeve disposed around the mandrel sleeve and proximate to a slip. The lower sleeve may be engaged with the mandrel sleeve.

The downhole tool may include one or more of its components made of a material having a composition of matter that includes an epoxy system comprising an epoxy resin and a hardener; an additive comprising a clay; a soluble medium; and a glass. The material may be a cured material. In aspects, the sleeve insert may be made of the cured material.

The downhole tool may include one or more of its components made of a material having a composition of matter that includes 100 parts by weight of a low viscosity cycloaliphatic epoxy resin with an anhydride curing agent; 10-20 parts by weight of an additive comprising a clay; 20-30 parts by weight of a water-soluble fiber; and 5-10 parts by weight of a glass. The material may be a cured material. In aspects, the sleeve insert may be made of the cured material.

Other embodiments of the disclosure pertain to a downhole tool useable for isolating sections of a wellbore that may include a mandrel sleeve having an at least one set of threads; and a sleeve insert threadingly engaged with the mandrel sleeve. The tool may include a first slip disposed about the mandrel sleeve. The first slip may include a circular slip body. The tool may include a second slip disposed about the mandrel sleeve. The tool may include a lower sleeve disposed about the mandrel and proximate a slip, which may be the second slip. The tool may include a seal element.

The downhole tool may include one or more of its components made of a material having a composition of matter that includes an epoxy system comprising an epoxy resin and a hardener; an additive comprising a clay; a soluble medium; and a glass. The material may be a cured material. In aspects, the sleeve insert may be made of the cured material.

The downhole tool may include one or more of its components made of a material having a composition of matter that includes 100 parts by weight of a low viscosity cycloaliphatic epoxy resin with an anhydride curing agent; 10-20 parts by weight of an additive comprising a clay; 20-30 parts by weight of a water-soluble fiber; and 5-10 parts by weight of a glass. The material may be a cured material. In aspects, the sleeve insert may be made of the cured material.

Yet other embodiments of the disclosure pertain to a method of setting a downhole tool in order to isolate one or more sections of a wellbore. The method may include one or more steps of: running the downhole tool into the wellbore to a desired position; placing the downhole tool under a load to expand a component of the downhole tool outwardly into at least partial engagement with a surrounding tubular; disconnecting the downhole tool from a setting device coupled therewith when the tensile load is sufficient to cause separation of the downhole tool from the setting device; and performing a downhole operation.

The method may include ensuring proper conditions for activation of a material of one or more components of the downhole tool to undergo a physical change, such as breaking, degrading, dissolving, and/or disassociating.

The material may have a composition of matter that includes an epoxy system comprising an epoxy resin and a hardener; an additive comprising a clay; a soluble medium; and a glass. The material may be a cured material. In aspects, the sleeve insert may be made of the cured material.

The material may have a composition of matter that includes 100 parts by weight of a low viscosity cycloaliphatic epoxy resin with an anhydride curing agent; 10-20 parts by weight of an additive comprising a clay; 20-30 parts by weight of a water-soluble fiber; and 5-10 parts by weight of a glass. The material may be a cured material. In aspects, the sleeve insert may be made of the cured material.

The method may include allowing sufficient time for a downhole fluid to dissolve a sleeve insert.

After the physical change occurs, producing a fluid to a surface facility through the inner bore.

The downhole tool of the method may include a mandrel sleeve comprising an inner bore; a sleeve insert disposed in the inner bore and threadingly connected with the mandrel sleeve; a slip disposed about the mandrel sleeve; a lower sleeve threadingly engaged with an outer surface of the mandrel sleeve.

These and other embodiments, features and advantages will be apparent in the following detailed description and drawings.

BRIEF DESCRIPTION OF THE DRAWINGS

For a more detailed description of the present disclosure, reference will now be made to the accompanying drawings, wherein:

FIG. 2A shows an isometric view of a system having a downhole tool, according to embodiments of the disclosure;

FIG. 2B shows an isometric view of the downhole tool of FIG. 2A positioned within a tubular, according to embodiments of the disclosure;

FIG. 2C shows a side longitudinal view of a downhole tool according to embodiments of the disclosure;

FIG. 2D shows a longitudinal cross-sectional view of a downhole tool according to embodiments of the disclosure;

DETAILED DESCRIPTION

Figure 1:
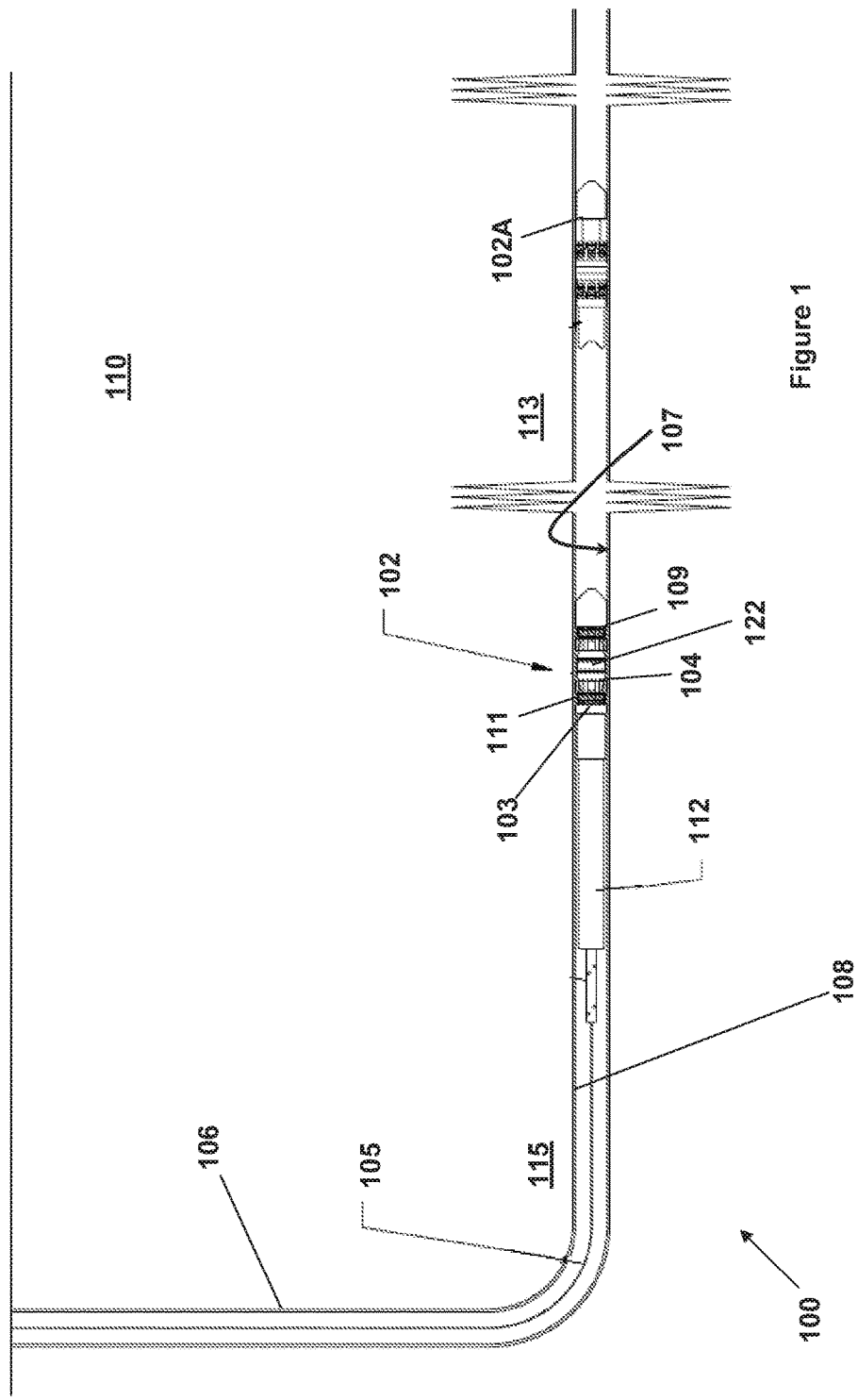
FIG. 1 is a side view of a process diagram of a conventional plugging system.

Herein disclosed are novel compositions of matter useable with apparatuses, systems, and methods that pertain to downhole tools for wellbore operations, details of which are described herein.

Embodiments herein may pertain to a downhole tool suitable for use in a wellbore that may include a mandrel sleeve; and a sleeve insert disposed within the mandrel sleeve. The tool may have a first slip disposed about the mandrel sleeve. There may be a second slip disposed about the mandrel sleeve. The second slip may be proximate to a conical surface. There may be a lower sleeve engaged with the second slip.

The mandrel sleeve may include a set of threads.

At least one of the first slip and the second slip may have a one-piece configuration with at least partial connectivity around the entirety of a circular slip body. Either of the slips may be made of a composite material. Either of the slips may be made of metal. Either of the slips may be surface hardened.

The downhole tool may include a seal element. The tool may include a composite member disposed about the mandrel. The composite member may be in engagement with the seal element. The composite member may be made of a first material and comprises a first portion and a second portion. The first material may be a composite material, such as filament wound material. The first portion may be a deformable portion. The second portion may be a resilient portion.

The tool may include a seal element positioned on the mandrel sleeve and in between a first cone and a second cone. The first cone may be proximate to the first slip, and/or the second cone may be proximate to the second slip.

There may be a bearing plate disposed around the mandrel sleeve.

In aspects, the set of threads may be one of shear threads and rounded threads.

In aspects, the mandrel sleeve may be made of non-dissolvable composite material. In aspects, the sleeve insert may be made of dissolvable material. In other aspects, the sleeve insert may be configured to dissolve or have some other change in physical characteristic within 24 hours of setting the downhole tool. The sleeve insert may be made of, or otherwise include, an anhydride cure resin.

Embodiments herein pertain to a downhole tool for use in a wellbore that may include a mandrel sleeve having at least one set of threads; and a sleeve insert threadingly engaged with the mandrel sleeve. The tool may further include a first slip disposed about the mandrel, the first slip further comprising a circular slip body; a second slip disposed about the mandrel; a lower sleeve engaged with the second slip; a seal element; and a bearing plate.

Either of the slips may have a one-piece configuration with at least partial connectivity around the entirety of a respective circular slip body, and at least two grooves disposed therein.

In aspects, the sleeve insert may be made of, or otherwise include, a dissolvable resin. The sleeve insert may be made of, or otherwise include, a resin comprising a flexibilizer. The flexibilizer may be or otherwise include clay. The flexibilizer may be or otherwise include nanoclay. The flexibilizer may be or otherwise include clay particles. The sleeve insert may be made of or otherwise include bentonite. The resin system may include a low viscosity cycloaliphatic epoxy resin with an anhydride curing agent.

The clay may include or be bentonite. The clay may include or be montmorillonite. The clay may be modified montmorillonite. The glass may include or be glass spheres. The composition may include at least one of organic hemp fiber, glass fiber, and combinations thereof. The composition may include a water-soluble material. In aspects, the water-soluble material may include or be one of a salt, a sugar, and combinations thereof.

The glass may include or be high-strength, hollow-glass spheres of an average diameter of 22 microns. The composition may include a water-soluble fiber. In aspects, the water-soluble fiber may include or be sodium polyacrylate.

Embodiments of the disclosure pertain to a device that may have (or being made from a material that may have) any composition of matter disclosed herein. The device may be selected from one of a downhole tool, a component of the downhole tool, and a frac ball. The device may be made from a cured composition.

Embodiments of the disclosure pertain to a device for use in a downhole environment that may have (or being made from a material that may have) any composition of matter disclosed herein.

Embodiments of the disclosure pertain to an apparatus that may have (or being made from a material that may have) any composition of matter disclosed herein.

Embodiments of the disclosure pertain to a downhole tool with one or more components that may have (or being made from a material that may have) any composition of matter disclosed herein.

Embodiments of the disclosure pertain to a frac ball that may have (or being made from a material that may have) any composition of matter disclosed herein.

The material may include a composition of an anhydride-based cure resin and a flexibilizer comprising clay.

The material may include a composition of an anhydride epoxy resin system and a thixotropic rheology modifier comprising clay.

The material may degrade at 0.24-17 g/hr at various temperatures.

The material may degrade within 24 hours of activation.

The clay may include a nano-clay and/or clay particles

The material may include polyglycolic acid.

Any number of devices, tools, and other components may be made of materials disclosed herein. The material may be a cured material.

The material may include a sugar-based epoxy.

A downhole tool made of a material of the present disclosure.

A downhole tool configured with one or more components made of a material of the present disclosure.

A device made of a material of the present disclosure.

A frac ball made of a material of the present disclosure.

A composition as disclosed herein further including a sugar-based epoxy.

The material may include a resin. The resin may be an anhydride-cured epoxy resin material. It may be possible to use sodium polyacrylate fiber in conjunction therewith, although any fiber that has dissolvable properties associated with it may be used. Resins described herein may include a flexibilizer distributed therewith.

A flexibilizer may include clay(s), hygroscopic clay, nano-clay, bentonite, or any other material that is easily distributable within the resin and reduces brittleness of the resin. Carbon nano-tubes may also add strength but promote capillary water flow through the resin matrix.

Embodiments of the disclosure pertain to a device that may have (or being made from a material that may have) any composition of matter disclosed herein. The device may be selected from the group consisting of a downhole tool, a component of the downhole tool, and a frac ball.

Embodiments of the disclosure pertain to a device for use in a downhole environment that may have (or being made from a material that may have) any composition of matter disclosed herein.

Embodiments of the disclosure pertain to an apparatus that may have (or being made from a material that may have) any composition of matter disclosed herein.

Embodiments of the disclosure pertain to a downhole tool with one or more components that may have (or being made from a material that may have) any composition of matter disclosed herein.

Embodiments of the disclosure pertain to a frac ball that may have (or being made from a material that may have) any composition of matter disclosed herein.

In aspects, the sleeve insert may be made of, or otherwise include, a dissolvable resin. The sleeve insert may be made of, or otherwise include, a resin comprising a thixotropic rheology modifier. The thixotropic rheology modifier may be or otherwise include clay.

Terms

Composition of matter: as used herein may refer to one or more ingredients or constituents that make up a material (or material of construction). For example, a material may have a composition of matter. Similarly, a device may be made of a material having a composition of matter.

Degradable Material: as used herein may refer to a composition of matter having properties and/or characteristics that, while subject to change over time and/or under certain conditions, lead to a change in the integrity of the material. As one example, the material may initially be hard, rigid, and strong at ambient or surface conditions, but over time (such as within about 12-36 hours) and under certain conditions (such as wellbore conditions), the material softens.

Dissolvable Material: analogous to degradable material; as used herein may refer to a composition of matter having properties and/or characteristics that, while subject to change over time and/or under certain conditions, lead to a change in the integrity of the material, including to the point of degrading, or partial or complete dissolution. As one example, the material may initially be hard, rigid, and strong at ambient or surface conditions, but over time (such as within about 12-36 hours) and under certain conditions (such as wellbore conditions), the material softens. As another example, the material may initially be hard, rigid, and strong at ambient or surface conditions, but over time (such as within about 12-36 hours) and under certain conditions (such as wellbore conditions), the material dissolves at least partially, and may dissolve completely.

Breakable Material: as used herein may refer to a composition of matter having properties and/or characteristics that, while subject to change over time and/or under certain conditions, lead to brittleness. As one example, the material may be hard, rigid, and strong at ambient or surface conditions, but over time and under certain conditions, becomes brittle. The breakable material may experience breakage into multiple pieces, but not necessarily dissolution.

Disassociatable Material: as used herein may refer to a composition of matter having properties and/or characteristics that, while subject to change over time and/or under certain conditions, lead to a change in the integrity of the material, including to the point of changing from a solid structure to a powdered material. As one example, the material may initially be hard, rigid, and strong at ambient or surface conditions, but over time (such as within about 12-36 hours) and under certain conditions (such as wellbore conditions), the material changes (disassociates) to a powder.

For some embodiments, the material of construction may include a composition of matter designed or otherwise having the inherent characteristic to change integrity or other physical attribute when exposed to certain wellbore conditions, such as a change in time, temperature, water, heat, pressure, solution, combinations thereof, etc. Heat may be present due to the temperature increase attributed to the natural temperature gradient of the earth, and water may already be present in existing wellbore fluids. The change in integrity may occur in a predetermined time period, which may vary from several minutes to several weeks. In aspects, the time period may be about 12 to about 36 hours.

In some embodiments, the material may degrade to the point of 'mush' or disassociate to a powder, while in other embodiments, the material may dissolve or otherwise disintegrate and be carried away by fluid flowing in the wellbore. The temperature of the downhole fluid may affect the rate change in integrity. The material need not form a solution when it dissolves in the aqueous phase. For example, the material may dissolve, break, or otherwise disassociate into sufficiently small particles (i.e., a colloid), that may be removed by the fluid as it circulates in the well. In embodiments, the material may become degradable, but not dissolvable. In other embodiments, the material may become degradable, and subsequently dissolvable. In still other embodiments, the material may become breakable (or brittle), but not dissolvable. In yet other embodiments, the material may become breakable, and subsequently dissolvable. In still yet other embodiments, the material may disassociate.

Referring now to FIGS. 2A and 2B together, isometric views of a system 200 having a downhole tool 202 illustrative of embodiments disclosed herein, are shown. FIG. 2B depicts a wellbore 206 formed in a subterranean formation 210 with a tubular 208 disposed therein. In an embodiment, the tubular 208 may be casing (e.g., casing, hung casing, casing string, etc.) (which may be cemented). A workstring 212 (which may include a part 217 of a setting tool coupled with adapter 252) may be used to position or run the downhole tool 202 into and through the wellbore 206 to a desired location.

In accordance with embodiments of the disclosure, the tool 202 may be configured as a plugging tool, which may be set within the tubular 208 in such a manner that the tool 202 forms a fluid-tight seal against the inner surface 207 of the tubular 208. In an embodiment, the downhole tool 202 may be configured as a bridge plug, whereby flow from one section of the wellbore 213 to another (e.g., above and below the tool 202) is controlled. In other embodiments, the downhole tool 202 may be configured as a frac plug, where flow into one section 213 of the wellbore 206 may be blocked and otherwise diverted into the surrounding formation or reservoir 210.

In yet other embodiments, the downhole tool 202 may also be configured as a ball-drop tool. In this aspect, a ball may be dropped into the wellbore 206 and flowed into the tool 202 and come to rest in a corresponding ball seat at the end of the mandrel 214. The seating of the ball may provide a seal within the tool 202 resulting in a plugged condition, whereby a pressure differential across the tool 202 may result. The ball seat may include a radius or curvature.

In other embodiments, the downhole tool 202 may be a ball-check plug, whereby the tool 202 is configured with a ball already in place when the tool 202 runs into the wellbore. The tool 202 may then act as a check valve, and provide one-way flow capability. Fluid may be directed from the wellbore 206 to the formation with any of these configurations.

Once the tool 202 reaches the set position within the tubular, the setting mechanism or workstring 212 may be detached from the tool 202 by various methods, resulting in the tool 202 left in the surrounding tubular and one or more sections of the wellbore isolated. In an embodiment, once the tool 202 is set, tension may be applied to the adapter 252 until the threaded connection between the adapter 252 and the mandrel 214 is broken. For example, the mating threads on the adapter 252 and the mandrel 214 (256 and 216, respectively as shown in FIG. 2D) may be designed to shear, and thus may be pulled and sheared accordingly in a manner known in the art. The amount of load applied to the adapter 252 may be in the range of about, for example, 20,000 to 40,000 pounds force. In other applications, the load may be in the range of less than about 10,000 pounds force.

Accordingly, the adapter 252 may separate or detach from the mandrel 214, resulting in the workstring 212 being able to separate from the tool 202, which may be at a predetermined moment. The loads provided herein are non-limiting and are merely exemplary. The setting force may be determined by specifically designing the interacting surfaces of the tool and the respective tool surface angles. The tool may 202 also be configured with a predetermined failure point (not shown) configured to fail or break. For example, the failure point may break at a predetermined axial force greater than the force required to set the tool but less than the force required to part the body of the tool.

Operation of the downhole tool 202 may allow for fast run in of the tool 202 to isolate one or more sections of the wellbore 206, as well as quick and simple drill-through to destroy or remove the tool 202. Drill-through of the tool 202 may be facilitated by components and sub-components of tool 202 made of drillable material that is less damaging to a drill bit than those found in conventional plugs. In an embodiment, the downhole tool 202 and/or its components may be a drillable tool made from drillable composite material(s), such as glass fiber/epoxy, carbon fiber/epoxy, glass fiber/PEEK, carbon fiber/PEEK, etc. Other resins may include phenolic, polyamidic, etc. All mating surfaces of the downhole tool 202 may be configured with an angle, such that corresponding components may be placed under compression instead of shear.

Figure 2E:
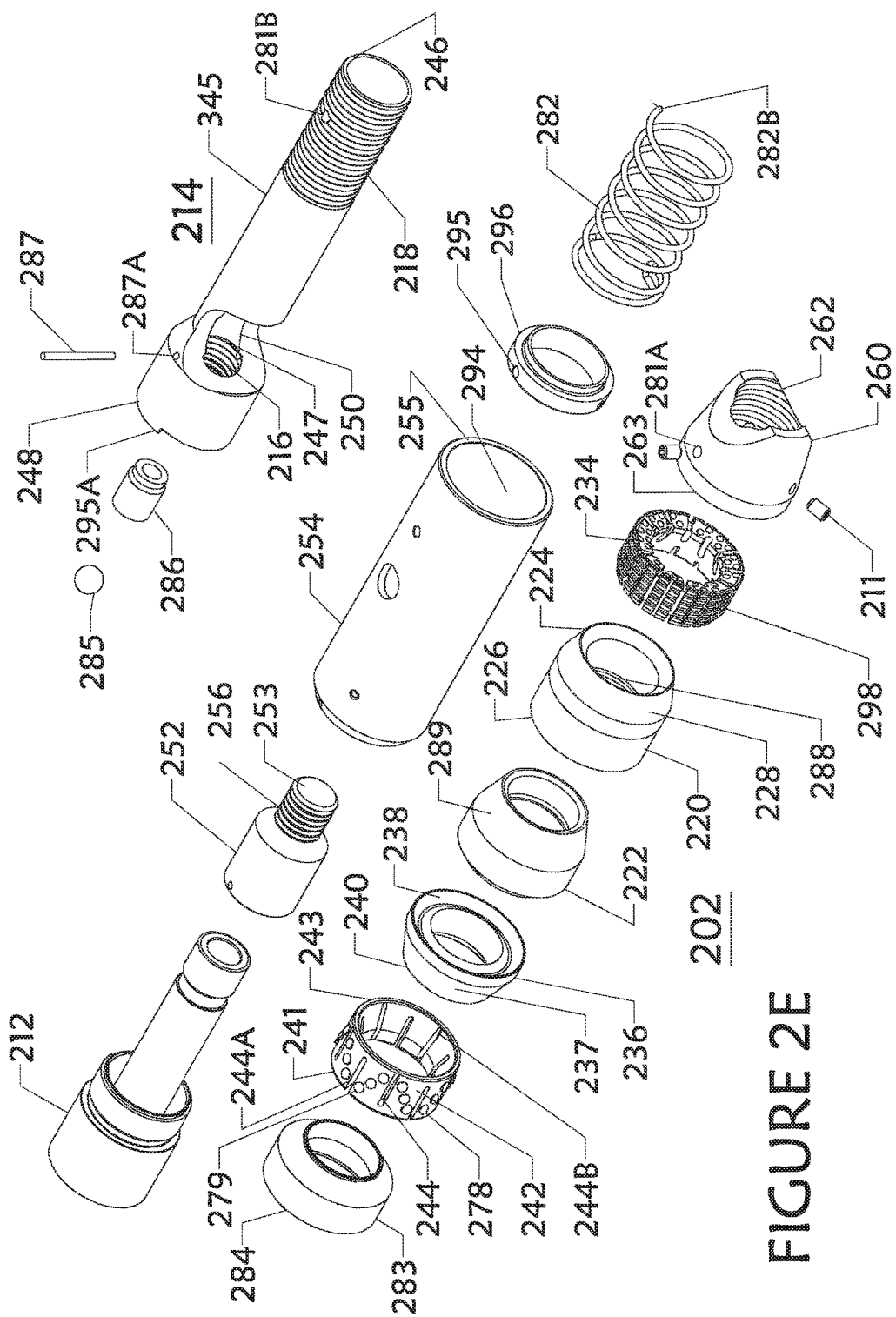
FIG. 2E shows an isometric component break-out view of a downhole tool according to embodiments of the disclosure.

Referring now to FIGS. 2C-2E together, a longitudinal view, a longitudinal cross-sectional view, and an isometric component break-out view, respectively, of downhole tool 202 useable with system (200, FIG. 2A) and illustrative of embodiments disclosed herein, are shown. The downhole tool 202 may include a mandrel 214 that extends through the tool (or tool body) 202. The mandrel 214 may be a solid body. In other aspects, the mandrel 214 may include a flowpath or bore 250 formed therein (e.g., an axial bore). The bore 250 may extend partially or for a short distance through the mandrel 214, as shown in FIG. 2E. Alternatively, the bore 250 may extend through the entire mandrel 214, with an opening at its proximate end 248 and oppositely at its distal end 246 (near downhole end of the tool 202), as illustrated by FIG. 2D.

The presence of the bore 250 or other flowpath through the mandrel 214 may indirectly be dictated by operating conditions. That is, in most instances the tool 202 may be large enough in diameter (e.g., 4¾ inches) that the bore 250 may be correspondingly large enough (e.g., 1¼ inches) so that debris and junk can pass or flow through the bore 250 without plugging concerns. However, with the use of a smaller diameter tool 202, the size of the bore 250 may need to be correspondingly smaller, which may result in the tool 202 being prone to plugging. Accordingly, the mandrel may be made solid to alleviate the potential of plugging within the tool 202.

With the presence of the bore 250, the mandrel 214 may have an inner bore surface 247, which may include one or more threaded surfaces formed thereon. As such, there may be a first set of threads 216 configured for coupling the mandrel 214 with corresponding threads 256 of a setting adapter 252.

The coupling of the threads, which may be shear threads, may facilitate detachable connection of the tool 202 and the setting adapter 252 and/or workstring (212, FIG. 2B) at the threads. It is within the scope of the disclosure that the tool 202 may also have one or more predetermined failure points (not shown) configured to fail or break separately from any threaded connection. The failure point may fail or shear at a predetermined axial force greater than the force required to set the tool 202.

The adapter 252 may include a stud 253 configured with the threads 256 thereon. In an embodiment, the stud 253 has external (male) threads 256 and the mandrel 214 has internal (female) threads; however, type or configuration of threads is not meant to be limited, and could be, for example, a vice versa female-male connection, respectively.

The downhole tool 202 may be run into wellbore (206, FIG. 2A) to a desired depth or position by way of the workstring (212, FIG. 2A) that may be configured with the setting device or mechanism. The workstring 212 and setting sleeve 254 may be part of the plugging tool system 200 utilized to run the downhole tool 202 into the wellbore, and activate the tool 202 to move from an unset to set position. The set position may include seal element 222 and/or slips 234, 242 engaged with the tubular (208, FIG. 2B). In an embodiment, the setting sleeve 254 (that may be configured as part of the setting mechanism or workstring) may be utilized to force or urge compression of the seal element 222, as well as swelling of the seal element 222 into sealing engagement with the surrounding tubular.

The setting device(s) and components of the downhole tool 202 may be coupled with, and axially and/or longitudinally movable along mandrel 214. When the setting sequence begins, the mandrel 214 may be pulled into tension while the setting sleeve 254 remains stationary. The lower sleeve 260 may be pulled as well because of its attachment to the mandrel 214 by virtue of the coupling of threads 218 and threads 262. As shown in the embodiment of FIGS. 2C and 2D, the lower sleeve 260 and the mandrel 214 may have matched or aligned holes 281A and 281B, respectively, whereby one or more anchor pins 211 or the like may be disposed or securely positioned therein. In embodiments, brass set screws may be used. Pins (or screws, etc.) 211 may prevent shearing or spin-off during drilling or run-in.

As the lower sleeve 260 is pulled in the direction of Arrow A, the components disposed about mandrel 214 between the lower sleeve 260 and the setting sleeve 254 may begin to compress against one another. This force and resultant movement causes compression and expansion of seal element 222. The lower sleeve 260 may also have an angled sleeve end 263 in engagement with the slip 234, and as the lower sleeve 260 is pulled further in the direction of Arrow A, the end 263 compresses against the slip 234. As a result, slip(s) 234 may move along a tapered or angled surface 228 of a composite member 220, and eventually radially outward into engagement with the surrounding tubular (208, FIG. 2B).

Serrated outer surfaces or teeth 298 of the slip(s) 234 may be configured such that the surfaces 298 prevent the slip 234 (or tool) from moving (e.g., axially or longitudinally) within the surrounding tubular, whereas otherwise the tool 202 may inadvertently release or move from its position. Although slip 234 is illustrated with teeth 298, it is within the scope of the disclosure that slip 234 may be configured with other gripping features, such as buttons or inserts.

Initially, the seal element 222 may swell into contact with the tubular, followed by further tension in the tool 202 that may result in the seal element 222 and composite member 220 being compressed together, such that surface 289 acts on the interior surface 288. The ability to "flower," unwind, and/or expand may allow the composite member 220 to extend completely into engagement with the inner surface of the surrounding tubular.

Additional tension or load may be applied to the tool 202 that results in movement of cone 236, which may be disposed around the mandrel 214 in a manner with at least one surface 237 angled (or sloped, tapered, etc.) inwardly of second slip 242. The second slip 242 may reside adjacent or proximate to collar or cone 236. As such, the seal element 222 forces the cone 236 against the slip 242, moving the slip 242 radially outwardly into contact or gripping engagement with the tubular. Accordingly, the one or more slips 234, 242 may be urged radially outward and into engagement with the tubular (208, FIG. 2B). In an embodiment, cone 236 may be slidingly engaged and disposed around the mandrel 214. As shown, the first slip 234 may be at or near distal end 246, and the second slip 242 may be disposed around the mandrel 214 at or near the proximate end 248. It is within the scope of the disclosure that the position of the slips 234 and 242 may be interchanged. Moreover, slip 234 may be interchanged with a slip comparable to slip 242, and vice versa.

Because the sleeve 254 is held rigidly in place, the sleeve 254 may engage against a bearing plate 283 that may result in the transfer load through the rest of the tool 202. The setting sleeve 254 may have a sleeve end 255 that abuts against the bearing plate end 284. As tension increases through the tool 202, an end of the cone 236, such as second end 240, compresses against slip 242, which may be held in place by the bearing plate 283. As a result of cone 236 having freedom of movement and its conical surface 237, the cone 236 may move to the underside beneath the slip 242, forcing the slip 242 outward and into engagement with the surrounding tubular (208, FIG. 2B).

The second slip 242 may include one or more, gripping elements, such as buttons or inserts 278, which may be configured to provide additional grip with the tubular. The inserts 278 may have an edge or corner 279 suitable to provide additional bite into the tubular surface. In an embodiment, the inserts 278 may be mild steel, such as 1018 heat treated steel. The use of mild steel may result in reduced or eliminated casing damage from slip engagement and reduced drill string and equipment damage from abrasion.

In an embodiment, slip 242 may be a one-piece slip, whereby the slip 242 has at least partial connectivity across its entire circumference. Meaning, while the slip 242 itself may have one or more grooves (or notches, undulations, etc.) 244 configured therein, the slip 242 itself has no initial circumferential separation point. In an embodiment, the grooves 244 may be equidistantly spaced or disposed in the second slip 242. In other embodiments, the grooves 244 may have an alternatingly arranged configuration. That is, one groove 244A may be proximate to slip end 241, the next groove 244B may be proximate to an opposite slip end 243, and so forth.

The tool 202 may be configured with ball-plug, check-valve assembly that includes a ball seat 286. The assembly may be removably or integrally formed therein. In an embodiment, the bore 250 of the mandrel 214 may be configured with the ball seat 286 formed or removably disposed therein. In some embodiments, the ball seat 286 may be integrally formed within the bore 250 of the mandrel 214. In other embodiments, the ball seat 286 may be separately or optionally installed within the mandrel 214, as may be desired.

The ball seat 286 may be configured in a manner so that a ball 285 seats or rests therein, whereby the flowpath through the mandrel 214 may be closed off (e.g., flow through the bore 250 is restricted or controlled by the presence of the ball 285). For example, fluid flow from one direction may urge and hold the ball 285 against the seat 286, whereas fluid flow from the opposite direction may urge the ball 285 off or away from the seat 286. As such, the ball 285 and the check valve assembly may be used to prevent or otherwise control fluid flow through the tool 202. The ball 285 may be conventionally made of a composite material, phenolic resin, etc., whereby the ball 285 may be capable of holding maximum pressures experienced during downhole operations (e.g., fracing). By utilization of retainer pin 287, the ball 285 and ball seat 286 may be configured as a retained ball plug. As such, the ball 285 may be adapted to serve as a check valve by sealing pressure from one direction, but allowing fluids to pass in the opposite direction.

The tool 202 may be configured as a drop-ball plug, such that a drop ball may be flowed to a drop ball seat 259. The drop ball may be much larger diameter than the ball of the ball check. In an embodiment, end 248 may be configured with a drop ball seat surface 259 such that the drop ball may come to rest and seat at in the seat proximate end 248. As applicable, the drop ball (not shown here) may be lowered into the wellbore (206, FIG. 2A) and flowed toward the drop ball seat 259 formed within the tool 202. The ball seat may be formed with a radius 259A (i.e., circumferential rounded edge or surface).

In other aspects, the tool 202 may be configured as a bridge plug, which once set in the wellbore, may prevent or allow flow in either direction (e.g., upwardly/downwardly, etc.) through tool 202. Accordingly, it should be apparent to one of skill in the art that the tool 202 of the present disclosure may be configurable as a frac plug, a drop ball plug, bridge plug, etc. simply by utilizing one of a plurality of adapters or other optional components. In any configuration, once the tool 202 is properly set, fluid pressure may be increased in the wellbore, such that further downhole operations, such as fracture in a target zone, may commence.

The tool 202 may include an anti-rotation assembly that includes an anti-rotation device or mechanism 282, which may be a spring, a mechanically spring-energized composite tubular member, and so forth. The device 282 may be configured and usable for the prevention of undesired or inadvertent movement or unwinding of the tool 202 components. As shown, the device 282 may reside in cavity 294 of the sleeve (or housing) 254. During assembly, the device 282 may be held in place with the use of a lock ring 296. In other aspects, pins may be used to hold the device 282 in place.

FIG. 2D shows the lock ring 296 may be disposed around a part 217 of a setting tool coupled with the workstring 212. The lock ring 296 may be securely held in place with screws inserted through the sleeve 254. The lock ring 296 may include a guide hole or groove 295, whereby an end 282A of the device 282 may slidingly engage therewith. Protrusions or dogs 295A may be configured such that during assembly, the mandrel 214 and respective tool components may ratchet and rotate in one direction against the device 282; however, the engagement of the protrusions 295A with device end 282B may prevent back-up or loosening in the opposite direction.

The anti-rotation mechanism may provide additional safety for the tool and operators in the sense that it may help prevent inoperability of tool in situations where the tool is inadvertently used in the wrong application. For example, if the tool is used in the wrong temperature application, components of the tool may be prone to melt, whereby the device 282 and lock ring 296 may aid in keeping the rest of the tool together. As such, the device 282 may prevent tool components from loosening and/or unscrewing, as well as prevent tool 202 unscrewing or falling off the workstring 212.

Drill-through of the tool 202 may be facilitated by the fact that the mandrel 214, the slips 234, 242, the cone(s) 236, the composite member 220, etc. may be made of drillable material that is less damaging to a drill bit than those found in conventional plugs. The drill bit will continue to move through the tool 202 until the downhole slip 234 and/or 242 are drilled sufficiently that such slip loses its engagement with the well bore. When that occurs, the remainder of the tools, which generally would include lower sleeve 260 and any portion of mandrel 214 within the lower sleeve 260 falls into the well. If additional tool(s) 202 exist in the well bore beneath the tool 202 that is being drilled through, then the falling away portion will rest atop the tool 202 located further in the well bore and will be drilled through in connection with the drill through operations related to the tool 202 located further in the well bore. Accordingly, the tool 202 may be sufficiently removed, which may result in opening the tubular 208.

Accordingly, components of tool 202 may be made of non-dissolvable materials (e.g., materials suitable for and are known to withstand downhole environments [including extreme pressure, temperature, fluid properties, etc.] for an extended period of time (predetermined or otherwise) as may be desired).

Just the same, one or more components of a tool of embodiments disclosed herein may be made of dissolvable materials (e.g., materials suitable for and are known to dissolve in downhole environments [including extreme pressure, temperature, fluid properties, etc.] after a brief or limited period of time (predetermined or otherwise) as may be desired). In an embodiment, a component made of a dissolvable material may begin to dissolve within about 3 to about 48 hours after setting of the downhole tool 202.

In other embodiments, components may be made of a material that may have brittle characteristics under certain conditions. In yet other embodiments, components may be made of a material that may have disassociatable characteristics under certain conditions.

One of skill in the art would appreciate that the material may be the same material and have the same composition, but that the physical characteristic of the material may change, and thus depend on variables such as curing procedures or downhole conditions.

The material may be a resin. The resin may be an anhydride-cured epoxy material. It may be possible to use sodium polyacrylate fiber in conjunction therewith, although any fiber that has dissolvable properties associated with it Some resins may be too brittle (or have too low $T_g$) for certain downhole conditions. Accordingly, resins described herein may include a flexibilizer distributed therewith. A flexibilizer may include clay(s), hygroscopic clay, nanoclay, bentonite, or any other material that is easily distributable within the resin and reduces brittleness of the resin. Carbon nano-tubes may also add strength but promote capillary water flow through the resin matrix.

Of note, smectic clay minerals, including montmorillonite and bentonite, are known to have dramatic shrink-swell capacity. Bentonite is known to have super high affinity for water, which may provide a synergistic effect. That is, bentonite may reduce the brittleness of the tool component, but at the same time induce an additional fracture stress to the tool component so that it dissolves more readily (as upon exposure to water, the volume of the bentonite within the tool component may expand up to about approximately 8× from its original state).

Embodiments herein provide for one or more components of a downhole tool (or other downhole devices) to be made of a material of construction that may include a composition of matter designed or otherwise having the inherent characteristic to change integrity or other physical attribute when exposed to certain wellbore conditions, such as a change in time, temperature, water, heat, pressure, solution, combinations thereof, etc. Heat may be present due to the temperature increase attributed to the natural temperature gradient of the earth, and water may already be present in the existing wellbore fluids. The change in integrity may occur in a predetermined time period, which may vary from several minutes to several weeks.

In some embodiments, the material may degrade to the point of 'mush,' while in other embodiments, the material may dissolve or otherwise disintegrate and be carried away by fluid flowing in the wellbore. The material may disassociate in some embodiments. The temperature of the downhole fluid may affect the rate change in integrity. The material need not form a solution when it dissolves in the aqueous phase. For example, the material may dissolve, break, or otherwise disassociate into sufficiently small particles (i.e., a colloid), that may be removed by the fluid as it circulates in the well. In embodiments, the material may become degradable, but not dissolvable. In other embodiments, the material may become degradable, and subsequently dissolvable. In still other embodiments, the material may become breakable (or brittle), but not dissolvable. In yet other embodiments, the material may become breakable, and subsequently dissolvable.

In accordance with the disclosure, any unlimited number of devices, apparatuses, tools, etc. may utilize one or more components made of a material having a composition of matter according to embodiments herein.

One such device may be a "frac ball" or "drop ball". As such, for some embodiments there may be a frac ball constructed of a material described herein. A downhole tool may also be configured with a "ball in place" (caged ball, etc.) that is similarly construct of a material described herein. In an operation utilizing one or more components made of a material of embodiments of the disclosure, the material may be differentiated in a manner that leads to different rates in physical change.

The frac ball of the present disclosure may be constructed of a suitable water-soluble material so that after a predetermined amount of time (presumably after the fracing is done), the frac ball may degrade or otherwise undergo physical change to provide an unobstructed flow path through a tool whereby production fluid may flow to surface.

Conventionally, downhole dissolvables fall into two groups: 1) a dissolving thermoplastic with a characteristic of hotter temperature, faster dissolve rate; and 2) dissolving metals, typically alloy-based often with other trace metals with a characteristic of being very expensive and cost prohibitive.

The examples to follow illustrate innovation around the prior art and conventional groups of dissolvables. For example, embodiments herein provide for use of constituents that in their own form do not dissolve, e.g., a clay material will 'swell' and/or somewhat solidify. Other constituents add differing performance characteristics. A soluble fiber(s), for example, may provide a 'pathway' (s) (in various, including random, direction) for fluid to flow therethrough and more readily attack other constituents. Thus, it has been discovered that a dissolving fiber is beneficial (over dissolving powder) because in forming the component or device, 'pathways' are formed. The pathways remain once the fiber dissolves, and allows fluid to much more readily move into surrounding contact with the other constituents. It has been further discovered that upon curing, the material may be characterized as being dissolvable, disassociatable, degradable, and/or breakable, depending upon the composition, curing process, and/or depending upon the surrounding activation conditions Percentages of constituents and length of fibers can be optimized to yield a desired physical characteristic known to occur in certain conditions. Care is needed to avoid temperature conditions that avoid 'swelling' the clay and closing of the pathways.

Accordingly, Embodiments herein provide for a material that may include four primary constituents: 1) a matrix or adhesive; 2) a plasticizer or thickener; 3) strengthener; and 4) a soluble medium.

The matrix (or the adhesive) is the resin or resin system. Among other things the matrix acts to combine and hold other constituents thereto. The resin may be an epoxy based resin system. In aspects, the resin system may be an epoxy resin with an anhydride hardener. The matrix may be an anhydride epoxy, or an epoxy resin hardened with an anhydride, like that of U.S. Pat. No. 5,629,379, incorporated herein by reference in its entirety for all purposes.

The plasticizer (or thickener) is suitable to 'thicken' the resin. The resin may be that which has a low viscosity, whereby other constituents may not be able to properly distribute uniformly therein. The plasticizer helps in uniform distribution of constituents. The plasticizer may be clay-based, including montmorillonite or modified montmorillonite (such as CLAYTONE APA).

The strengthener may be suitable to increase mechanical properties of the material. In aspects, it may be desirable to want high compressive strength. An example strengthener includes glass bubbles. The glass does not increase tensile strength, but may increase plasticity—thus dramatically increasing compressive strength of, for example, a frac ball. Normally, a frac ball is brittle, as the compressive strength is not very high. Glass (e.g., glass microspheres) may be added. If not added, the resulting material may not have high compressive strength.

The soluble medium is suitable to provide pathways within the cured material. Once the material is subjected to its activation environment, the medium dissolves, and the surrounding fluid can easily and readily infiltrate and reach other constituents via the pathways.

The resultant cured material has a synergistic benefit of having a specific gravity of close to one, which of significance is substantially equivalent to most wellbore fluids (which are often predominantly water). Accordingly, the material may be naturally buoyant in the presence of frac fluid, whereby the material may be readily flowed back. This is the case whether the material is in its original state, such as a solid frac ball, or the material has undergone a physical change (e.g., solid to dissolved). In some aspects, it may be preferable or desired to flow back a ball. In other aspects, it is undesirable to flow a ball back, and instead preferred to keep materials downhole. Embodiments herein provide for the ability to form a composition useable as a material for a device that can be customized for a specific customer need (e.g., material that is readily flowed back; or material that is not readily flowed back).

Embodiments of the disclosure pertain to a composition of matter that may include in the range of: about 100 parts by weight of an epoxy resin with an anhydride curing agent; about 10-20 parts by weight of a clay; about 20-30 parts by weight of a fiber; and about 5-10 parts by weight of a glass.

Embodiments of the disclosure pertain to a composition of matter that may be: a. 100 parts by weight of an epoxy resin with an anhydride curing agent; b. about 10-20 parts by weight of a clay; c. about 20-30 parts by weight of a fiber; and d. about 5-10 parts by weight of a glass.

One of skill in the art would appreciate subjecting a material having a composition of matter in accordance with embodiments of the disclosure to a curing process. The physical properties of the resultant cured material may dependent in a manner of significance to the selected constituents and/or curing process. The curing process may include two aspects, first pertaining to a curing device, such as an oven, and secondly pertaining to what happens to the material in the oven, with the latter being dependent on the form. Because of the insulating properties of the material, there may be 'soak' (i.e., a held temperature) for a period of time to ensure the core reaches desired temp.

The constituents may be mixed together in a powered mixer of suitable HP and volume. The mixed material may then be transferred into a mold suitable for the curing process. The mold may be the shape of the desired cured-material device. For example, the mold may be spherical in shape to produce a spherical ball. Just the same, the mold may produce a resultant product that may then be subjected to a finishing process such as grinding or machining in order to produce the desired cured-material device.

The curing process may include operating a curing device to start within an initial curing temperature in the range of about 70° F. to about 100° F. The material may then be placed therein, and the device closed in a manner to maintain heat. The curing device may then be heated a ramp up rate of about 0.2-2° F./min to a temperature in the range of about 120° F. to about 200° F. The device may be held at a temperature of 120° F. to about 200° F. for a predetermined amount of soak time of about 30 minutes to about 120 minutes.

The curing device may then be heated a ramp up rate of about 0.2-2° F./min to a temperature in the range of about 160° F. to about 250° F. The curing device may then be heated a ramp up rate of about 1-4° F./min to a temperature in the range of about 250° F. to about 350° F. The device may be held at a temperature of 250° F. to about 350° F. for a predetermined amount of soak time of about 30 minutes to about 120 minutes.

The curing device may then be ramped down at a rate of about 0.2-2° F./min to a temperature in the range of about 70° F. to about 100° F.

The forgoing curing process operation may yield a material that experiences a starting material temperature in the range of about 70° F. to about 100° F. The material experiences a temperature ramp up 12-120° F./hr to a temperature in the range of about 300° F. to about 400° F. The material may have a higher material temperature than the curing device as a result of a thermal reaction from the activity of the selected constituents. The device may be operated to hold the material at a material temperature of about 300° F. to about 400° F. for a predetermined amount of time in the range of about 30 minutes to about 120 minutes. The material may then have its temperature ramped down at a rate of 12-120° F./hr to a temperature in the range of about 70° F. to about 100° F.

Material of Construction—Composition—Example 1

The composition of Example 1 may include a base epoxy system that comprises an epoxy resin with an anhydride curing agent (100 parts by wt.). The base resin system may be desirably prone to break down in high temp/high pressure water.

The composition may include about 10 to about 20 parts modified montmorillonite clay.

The composition may include about 5-10 parts by weight high-strength (8 ksi collapse), glass spheres. The spheres may be hollow. The spheres may have a diameter of about 1 to about 1000 microns. The spheres may have an average diameter of about 15 to about 25 microns.

The composition may include a water-soluble fiber, such as sodium polyacrylate.

The material of the present disclosure may include a composition of matter that includes one or more of an epoxy resin with an anhydride curing agent; a clay; a water-soluble fiber; and a glass.

Accordingly, embodiments of the disclosure pertain to the composition having a clay comprises modified montmorillonite, and glass that includes high-strength, hollow-glass microspheres.

In aspects, the clay may include or be modified montmorillonite; and/or the glass may include or be high-strength hollow glass microspheres. The composition may include a water-soluble material. In aspects, the water-soluble material may include or be sodium polyacrylate.

The resin system may be an anhydride-cured epoxy material.

The composition is subjected to curing in order to yield a finalized product. A device of the disclosure may be formed during the curing process, or subsequently thereafter. The composition may be cured with a curing process of the present disclosure.

Composition—Example 2

The composition of Example 2 may include a base resin system that comprises an epoxy with an anhydride-based curing agent (~100 parts by wt.). The base resin system may be desirably prone to break down in high temp/high pressure water.

The composition may include about 0 to about 30 parts of a clay-based material. The composition may include about 25 to about 30 parts by weight desiccated bentonite (swelling clay). The composition may include about 5 to about 10 parts Montmorillonite (non-swelling/water-conducting) clay.

The composition may include about 0 to about 10 parts by weight of a glass material. In aspects, the glass material may be glass microspheres, typically being between 1 and 1000 micrometers in diameter. In aspects, the glass material may be a low-pressure (~800 psi collapse) hollow glass nanospheres.

The composition may include an organic fiber (such as hemp or comparable) or glass fiber.

The composition may include a small or trace amount (by weight) of a water-soluble material, such as salt or sugar (or both). The presence of the water-soluble material may contribute to the material being 'mushy' (in contrast to brittle) under certain conditions.

The material of the present disclosure may include a composition of matter that includes one or more of an epoxy with an anhydride-based hardener; a swelling clay; a non-swelling clay; and a glass.

Accordingly, embodiments of the disclosure pertain to the composition that may have swelling clay that includes bentonite, non-swelling clay that includes montmorillonite, and glass that includes glass spheres.

In aspects, the swelling clay may include or be bentonite; the non-swelling clay may include or be montmorillonite; and/or the glass may include or be low pressure hollow glass nanospheres. The composition may include at least one of organic hemp fiber, glass fiber, and combinations thereof. The composition may include a water-soluble material. In aspects, the water-soluble material may include or be one of a salt, a sugar, and combinations thereof.

The resin system may be made from or include polyglycolic acid (PGA). The resin system may be an anhydride-cured epoxy material. The resin system may be cast or molded pure resin or may be reinforced with short chopped glass, carbon or natural fiber hemp, canvas or silk. It may be possible to use PGA fiber in conjunction therewith, although any resin that may have dissolvable properties associated therewith may be used. Some resins may be too brittle (or have too low $T_g$) for certain downhole conditions. Accordingly, resins described herein may include a flexibilizer distributed therewith.

A flexibilizer may include clay(s), hygroscopic clay, nanoclay, bentonite, or any other material that is easily distributable within the resin and reduces brittleness of the resin. Carbon nano-tubes may also add strength but promote capillary water flow through the resin matrix. The composition is subjected to curing in order to yield a finalized product. A device of the disclosure may be formed during the curing process, or subsequently thereafter. The composition may be cured with a curing process of the present disclosure.

Example 3

The composition of Example 2 may include about 100 parts by weight base resin system that comprises an epoxy with a curing agent (or 'hardener'). The base resin may be desirably prone to break down in a high temp and/or high pressure aqueous environment. The epoxy may be a cycloaliphatic epoxy resin with a low viscosity and a high glass transition temperature. The epoxy may be characterized by having high adhesability with fibers. As an example, the epoxy may be 3,4-epoxycyclohexylmethyl-3',4'-epoxycyclohexane-carboxylate.

The hardener may be an anhydride, i.e., anhydride-based. For example, the curing agent may be a methyl carboxylic, such as methyl-5-norborene-2, 3-dicarboxylic anhydride. The hardener may include, and be pre-catalyzed with, an accelerator. The accelerator may be imidazole-based.

The accelerator may help in saving or reducing the curing time.

The ratio of epoxy to curing agent may be in the range of about 0.5 to about 1.5. In more particular aspects, the ratio may be about 0.9 to about 1.0.

Processing conditions of the base resin system may include multiple stages of curing.

The composition may include an additive comprising a clay. The additive may be a solid in granular or powder form. The additive may be about 0 to about 30 parts by weight of the composition of a montmorillonite-based clay. In aspects, the clay may be about 0 to about 20 parts by weight of the composition. The additive may be an organophilic clay.

An example of a suitable clay additive may be CLAY-TONE® APA by BYK Additives, Inc.

The composition may include a glass, such as glass bubbles or spheres (including microspheres and/or nanospheres). The glass may be about 0 to about 20 parts by weight of the composition. In aspects, the glass may be about 5 to about 15 parts by weight of the composition.

An example of a suitable glass may be 3M Glass Bubbles 342XHS by 3M.

The composition may include a fiber. The fiber may be organic. The fiber may be a water-soluble fiber. The fiber may be in the range of about 0 to about 30 parts by weight of the composition. In aspects, the fiber may be in the range of about 15 to about 25 parts by weight.

The fiber may be made of a sodium polyacrylate-based material. The fiber may resemble a thread or string shape. In aspects, the fiber may have a fiber length in the range of about 0.1 mm to about 2 mm. The fiber length may be in the range of about 0.5 mm to about 1 mm. The fiber length may be in the range of substantially 0 mm to about 6 mm The fiber may be a soluble fiber like EVANESCE' water soluble fiber from Technical Absorbents Ltd.

The composition is subjected to curing in order to yield a finalized product. A device of the disclosure may be formed during the curing process, or subsequently thereafter. The composition may be cured with a curing process of the present disclosure.

Example 4

The composition of Example 3 may be characterized as a material that includes a polyester and aluminosilicate clay.

The composition may include an ester-based component, a base resin, and an additive characterized by the ability to become acidic in an aqueous environment.

The additive may be Halloysite like that provided by Applied Materials, which may be in the form of a nano-tube. The nano-tube may be made by rolling a sheet of aluminosilicate clay. The additive may become acidic in aqueous environments and suitable to attack plastic, especially thermoplastics having ester groups, like polyethylene terephthalate (PET). The additive may increase the strength of the material. The additive may be suitable for aggressively attacking polyester in aqueous environments.

Halloysite may be characterized as an aluminosilicate mineral with the same chemistry as kaolinite but instead of the flatsheets typical of kaolinite, the sheets having been rolled up into tubes by a natural hydrothermal process.

The composition may include a modified Halloysite/PLLA (poly (L-lactic acid)/glass fiber.

The composition is subjected to curing in order to yield a finalized product. A device of the disclosure may be formed during the curing process, or subsequently thereafter. The composition may be cured with a curing process of the present disclosure.

Figure 3A:
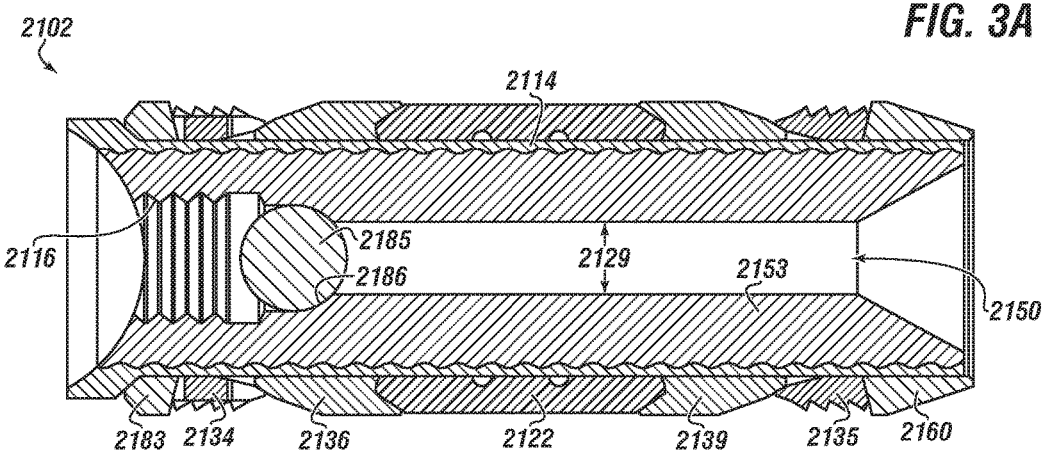
FIG. 3A shows a longitudinal cross-sectional view of a downhole tool with a hybrid sleeve according to embodiments of the disclosure.
Figure 3B:
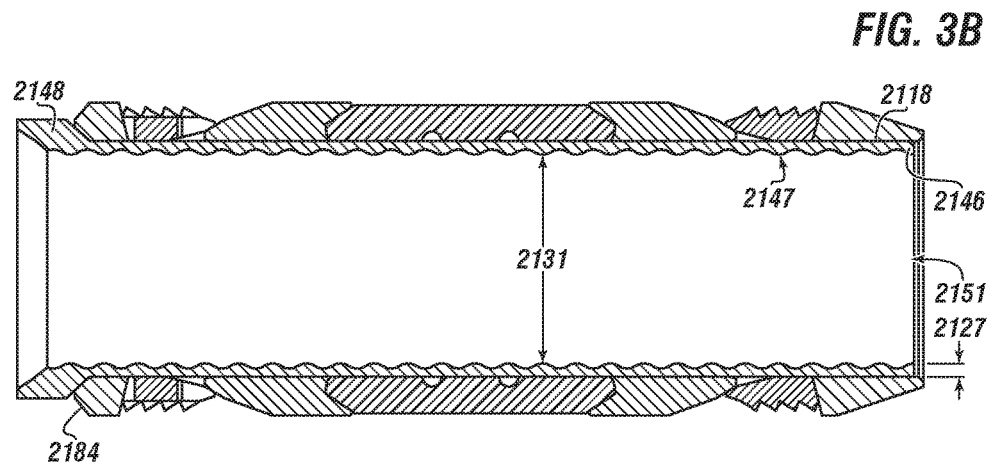
FIG. 3B shows a longitudinal cross-sectional view of the tool of FIG. 3A with a dissolved sleeve insert according to embodiments of the disclosure.

Referring now to FIGS. 3A and 3B together, a longitudinal cross-sectional view of a downhole tool with a hybrid sleeve, in accordance with embodiments disclosed herein, are shown. Downhole tool 2102 may be run, set, and operated as described herein and in other embodiments (such as in System 200), and as otherwise understood to one of skill in the art. Components of the downhole tool 2102 may be arranged and disposed about a mandrel or mandrel sleeve 2114, as described herein and in other embodiments, and as otherwise understood to one of skill in the art. Thus, downhole tool 2102 may be comparable or identical in aspects, function, operation, components, etc. as that of other tool embodiments, and redundant discussion is limited for sake of brevity.

On occasion it may be necessary or otherwise desired to produce a fluid from the formation while leaving a set plug in place. However, an inner diameter (ID) of a bore (e.g., 250, FIG. 2D) in a mandrel (214) may be too narrow to effectively and efficiently produce the fluid—thus in embodiments it may be desirous to have an oversized ID 2131 through the tool 2102. The ID of the bore is normally adequate to allow drop balls to pass therethrough, but may be inadequate for production. In order to produce desired fluid flow, it often becomes necessary to drill out a set tool—this requires a stop in operations, rig time, drill time, and related operator and equipment costs.

On the other hand, the presence of the oversized ID 2131 of bore 2151, and thus a larger cross sectional area as compared to bore 2150, provides effective and efficient production capability through the tool 2102 without the need to resort to drilling of the tool. However a reduced wall thickness 2127 of mandrel sleeve 2114 may be problematic to the characteristics of the tool 2102, especially during the setting sequence. Accordingly, a sleeve insert (or liner, reinforcing member, etc.) 2153 may be used to provide an effective wall thickness of the mandrel 2114 during the run-in and setting sequence comparable to other embodiments disclosed herein.

Figure 3C:
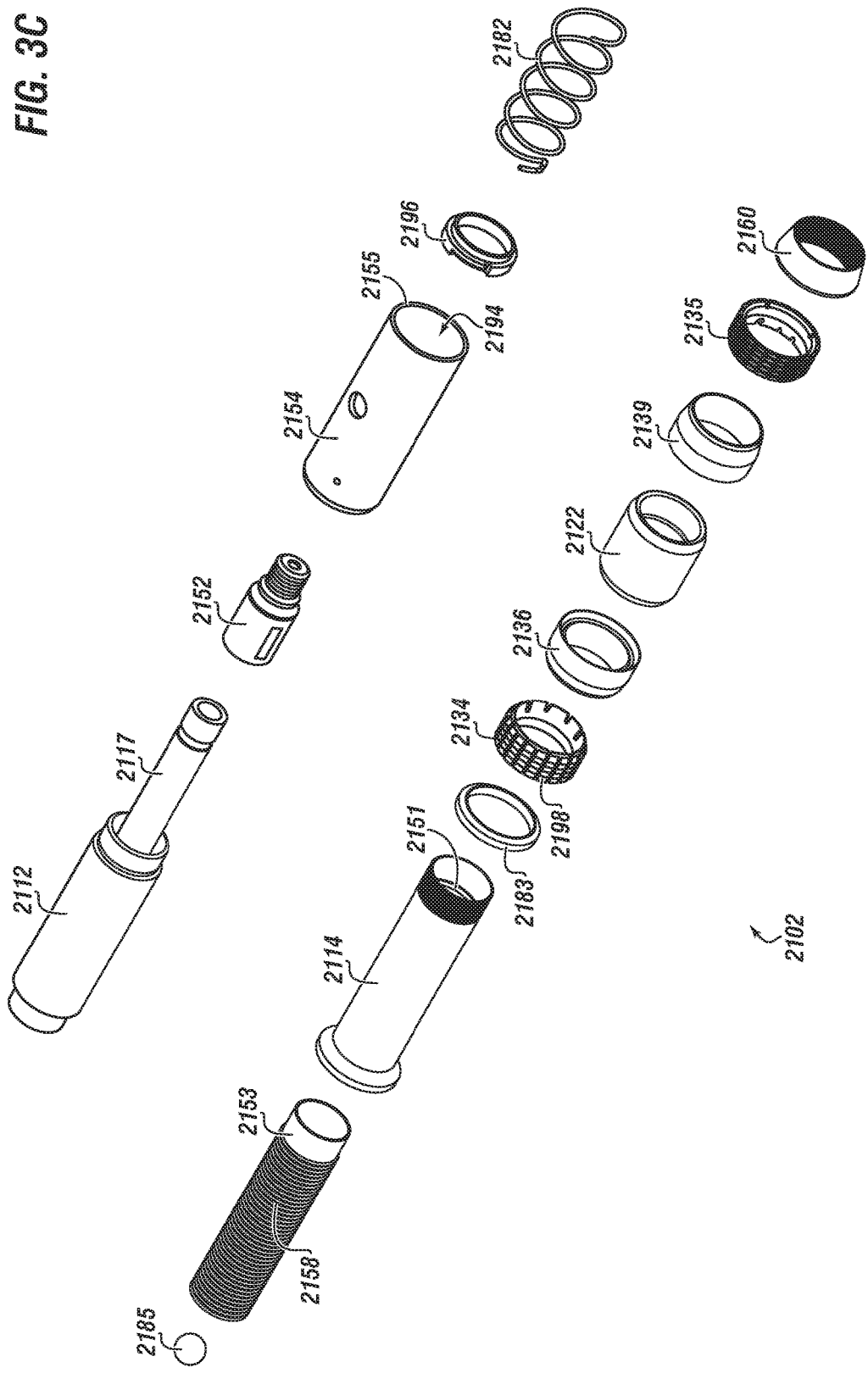
FIG. 3C shows an isometric component breakout view of a downhole tool with a hybrid sleeve according to embodiments of the disclosure.
Figure 3D:
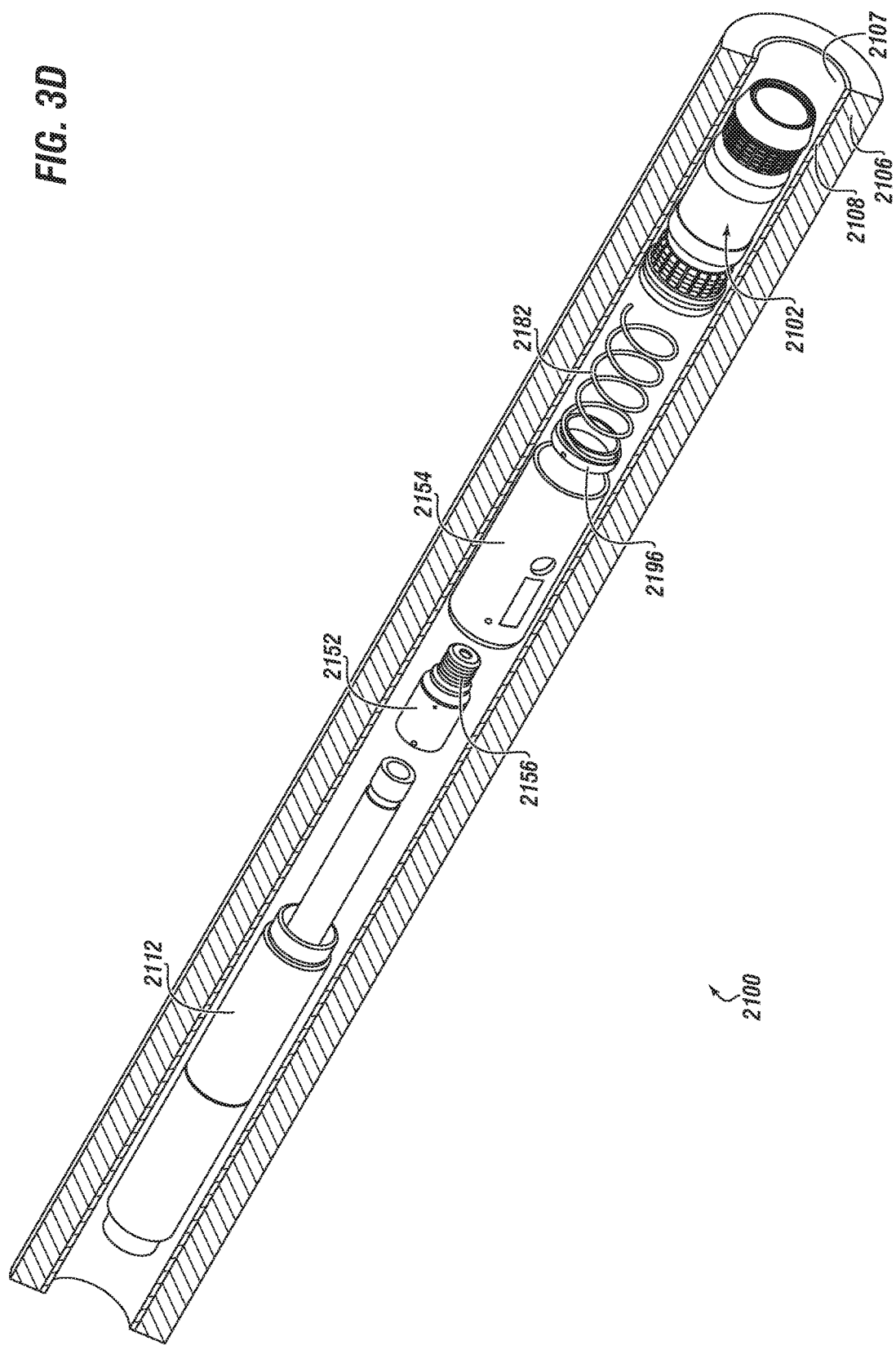
FIG. 3D shows an isometric component breakout view of a system using a downhole tool with a hybrid sleeve according to embodiments of the disclosure.

Referring briefly to FIGS. 3C and 3D together, an isometric component breakout view of a downhole tool with a hybrid sleeve according to embodiments of the disclosure, and an isometric component breakout view of a system using a downhole tool with a hybrid sleeve, respectively, in accordance with embodiments disclosed herein, are shown.

FIG. 3D depicts a wellbore 2106 formed in a subterranean formation (210) with a tubular 2108 disposed therein. A workstring 2112 (which may include a part 2117 of a setting tool coupled with adapter 2152) may be used to position or run the downhole tool 2102 into and through the wellbore 2106 to a desired location. In accordance with embodiments of the disclosure, the tool 2102 may be configured as a plugging tool, which may be set within the tubular 2108 in such a manner that the tool 2102 forms a fluid-tight seal against the inner surface 2107 of the tubular 2108. In an embodiment, the downhole tool 2102 may be configured as a frac plug, where flow into one section of the wellbore 2106 may be blocked and otherwise diverted into the surrounding formation or reservoir.

Once the tool 2102 reaches the set position within the tubular, the setting mechanism or workstring 2112 may be detached from the tool 2102 by various methods, resulting in the tool 2102 left in the surrounding tubular and one or more sections of the wellbore isolated. In an embodiment, once the tool 2102 is set, tension may be applied to the adapter 2152 until the threaded connection between the adapter 2152 and the mandrel 2114 (or insert 2153) is broken. For example, the mating threads on the adapter 2152 and the insert 2153 (2156 and 2116, FIG. 3A) may be designed to shear, and thus may be pulled and sheared accordingly in a manner known in the art.

In an embodiment, the downhole tool 2102 and/or its components may be a drillable tool made from drillable composite material(s), such as glass fiber/epoxy, carbon fiber/epoxy, glass fiber/PEEK, carbon fiber/PEEK, etc. Other resins may include phenolic, polyamide, etc. One or more mating surfaces of the downhole tool 2102 may be configured with an angle, such that corresponding components may be placed under compression instead of shear.

In accordance with the disclosure, components of tool 2102 may be made of non-dissolvable materials (e.g., materials suitable for and are known to withstand downhole environments [including extreme pressure, temperature, fluid properties, etc.] for an extended period of time (predetermined or otherwise) as may be desired).

In accordance with the disclosure, components of tool 2102 may be made of dissolvable materials (e.g., materials suitable for and are known to dissolve in downhole environments [including extreme pressure, temperature, fluid properties, etc.] after a brief or limited period of time (predetermined or otherwise) as may be desired). In an embodiment, a component made of a dissolvable material may begin to dissolve within about 3 to about 48 hours after setting of the downhole tool. In aspects, the insert 2153 may be made of a composition of material described herein. The insert 2153 may be made of a material that is adequate to provide durability and strength to the tool 2102 for a sufficient amount of time that includes run-in, setting and frac, but then begins to change (i.e., degrade, dissolve, etc.), shortly thereafter.

The outer sleeve 2114 may be machined from metal, including such as aluminum or dissolvable aluminum alloy. Alternatively, the sleeve 2114 may be formed from a clay, glass bubble, water-soluble fiber material further mixed with a dissolving resin.

The downhole tool 2102 may include the mandrel sleeve 2114 that extends through the tool (or tool body) 2102. The mandrel sleeve 2114 may include a flowpath or bore 2151 formed therein (e.g., an axial bore). The bore 2151 may extend partially or for a short distance through the mandrel 2114, or the bore 2151 may extend through the entire mandrel sleeve 2114, with an opening at its proximate end 2148 and oppositely at its distal end 2146.

The presence of the bore or other flowpath through the mandrel sleeve 2114 may indirectly be dictated by operating conditions. That is, in most instances the tool 2102 may be large enough in diameter (e.g., in a range of about 4-5 inches) that the bore 2151 may be correspondingly large enough (e.g., 3 inches) so that fluid may be produced therethrough. The tool OD should probably not exceed 5.5 inches for standard operation. The small ID should be around 1". The dissolved ID is preferably 3".

With the presence of the bore 2151, the mandrel sleeve 2114 may have an inner bore surface (2147, FIG. 3B), which may include one or more threaded surfaces formed thereon. As such, there may be a first set of threads 2119 configured for coupling the mandrel sleeve 2114 with corresponding threads 2158 of the sleeve insert 2153. FIG. 3A illustrates how at least a portion of the sleeve insert 2153 may be radially laterally proximate to a sealing element 2122 disposed around the outside of the sleeve mandrel 2114.

The setting device(s) and components of the downhole tool 2102 may be as described and disclosed with other embodiments herein. The tool 2102 may include a lower sleeve 2160 engaged with the mandrel sleeve 2114. The mandrel sleeve 2114 and the lower sleeve 2160 may be threadingly engaged via mated threaded connection 2118. Accordingly, during setting, as the lower sleeve 2160 is pulled, the components disposed about the mandrel sleeve 2114 between the lower sleeve 2160 and the setting sleeve 2154 may begin to compress against one another. This force and resultant movement causes compression and expansion of seal element 2122.

As tension or load may be applied to the tool 2102 that results in movement of cone 2136, which may be disposed around the mandrel 2114 in a manner with at least one surface angled (or sloped, tapered, etc.) inwardly of the slip 2134. In a similar respect, second cone 2139 may also be disposed around the mandrel 2114, and may move inwardly of the second slip 2135.

As such, the seal element 2122 may force the cone 2136 against the slip 2134 (and cone 2139 against slip 2135), moving the slips 2134/2135 radially outwardly into contact or gripping engagement with the tubular. Accordingly, the one or more slips 2134, 2135 may be urged radially outward and into engagement with the tubular (see 208, FIG. 2B). As shown, the first slip 2134 may be at or near distal end 2146, and the second slip 2135 may be disposed around the mandrel 2114 at or near the proximate end 2148. It is within the scope of the disclosure that the position of the slips 2134 and 2135 may be interchanged. As slips 2134 and 2135 may be identical or comparable, the slips 2134 and 2135 may be interchanged with each other.

Slip(s) 2134, 2135 may move or otherwise be urged eventually radially outward into engagement with the surrounding tubular 2108. Serrated outer surfaces or teeth 2198 of the slip(s) 2134 (or slip 2135) may be configured such that the surfaces 2198 prevent the slip 2134 (or tool) from moving (e.g., axially or longitudinally) within the surrounding tubular, whereas otherwise the tool 2102 may inadvertently release or move from its position. Although slip 2134 is illustrated with teeth 2198, it is within the scope of the disclosure that slip 2134 may be configured with other gripping features, such as buttons or inserts.

Because the sleeve 2154 is held rigidly in place, the sleeve 2154 may engage against a bearing plate 2183 that may result in the transfer load through the rest of the tool 2102. The setting sleeve 2154 may have a sleeve end 2155 that abuts against the bearing plate end 2184.

The slip 2134 may include one or more, gripping elements, which may be configured to provide additional grip with the tubular 2108.

A ball seat 2186 may be configured in a manner so that a ball 2185 seats or rests therein, whereby the flowpath through the mandrel sleeve 2114 (or sleeve insert 2153) may be closed off (e.g., flow through the bore 2150 is restricted or controlled by the presence of the ball 2185). For example, fluid flow from one direction may urge and hold the ball 2185 against the seat 2186. Ball 2185 may be made of a material of composition of embodiments disclosed herein.

It should be apparent to one of skill in the art that the tool 2102 of the present disclosure may be configurable as a frac plug, a drop ball plug, bridge plug, etc. simply by utilizing one of a plurality of adapters or other optional components. In any configuration, once the tool 2102 is properly set, fluid pressure may be increased in the wellbore, such that further downhole operations, such as fracture in a target zone, may commence.

The tool 2102 may include an anti-rotation assembly that includes an anti-rotation device or mechanism 2182, which may be a spring, a mechanically spring-energized composite tubular member, and so forth. The device 2182 may be configured and usable for the prevention of undesired or inadvertent movement or unwinding of the tool 2102 components. As shown, the device 2182 may reside in cavity 2194 of the sleeve (or housing) 2154. During assembly the device 2182 may be held in place with the use of a lock ring 2196. In other aspects, pins may be used to hold the device 2182 in place.

The anti-rotation mechanism may provide additional safety for the tool and operators in the sense it may help prevent inoperability of tool in situations where the tool is inadvertently used in the wrong application. As such, the device 2182 may prevent tool components from loosening and/or unscrewing, as well as prevent tool 2102 unscrewing or falling off the workstring 2112.

Drill-through of the tool 2102 may be facilitated by the fact that the mandrel sleeve 2114 and other components, etc. may be made of drillable material that is less damaging to a drill bit than those found in conventional plugs. The drill bit will continue to move through the tool 2102 until the slips are drilled sufficiently that such slip loses its engagement with the well bore. Remaining components may fall into the well or onto another tool positioned therebelow. Accordingly, the tool 2102 may be sufficiently removed, which may result in opening the tubular 2108. Components, such as the slip 2134 may be prefilled or prefitted with a reactant that aids in destruction of the slip and other tool components once the reactant is exposed to the downhole environment. The reactant may be, for example, anionic, salt-based, caustic, sulfur, sodium polyacrylate, or other suitable material that becomes highly reactive upon wetness or exposure to an aqueous fluid.

Advantages

The composition(s) of matter disclosed or claimed herein are not limited in utility to downhole conditions or operations (and related tools, devices, etc.), but instead may find utility in many applications in which initial hardness (strength) or durability, and subsequent degradability, dissolvability, breakage, dissociation, etc., is desired.

Yet other advantages may be recognized during post-frac, where downhole fluids can flow without intervention of a drilling rig to remove the tool. In certain embodiments, the component or device degrades or undergoes other physical change, reducing hydraulic restriction and allows valuable fluids to be recovered and/or flow back frac water and potentially start oil/gas production. Faster is better. Advantageously this can be done with just a hose and tank truck.

While example embodiments of the disclosure have been shown and described, modifications thereof can be made by one skilled in the art without departing from the spirit and teachings of the disclosure. These embodiments are exemplary only and not limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A downhole tool suitable for use in a wellbore, the tool comprising:
    a mandrel sleeve comprising:
        a proximate end; a distal end; a length of mandrel sleeve body extending between the proximate end and the distal end; and an inner sleeve bore comprising an inner sleeve bore diameter;
    a sleeve insert disposed within, and threadingly engaged with, the mandrel sleeve, and extending from the proximate end to the distal end;
    a first slip disposed about the mandrel sleeve;
    a second slip disposed about the mandrel sleeve;
    a seal element disposed between the first slip and the second slip; and
    a lower sleeve disposed about the mandrel sleeve proximate to the second slip, and threadingly engaged with the distal end of the mandrel sleeve,
    wherein the sleeve insert is configured with an insert sleeve bore that extends from a first insert end to a second insert end, wherein the insert sleeve bore comprises an inner insert bore diameter, and wherein the inner insert bore diameter is smaller than the inner sleeve bore diameter.

2. The downhole tool of claim 1, wherein the mandrel sleeve comprises a set of threads, and wherein at least one of the first slip and the second slip have a one-piece configuration with at least partial connectivity around the entirety of a circular slip body, and at least two grooves disposed therein, and wherein the sleeve insert bore comprises a ball seat formed therein.

3. The downhole tool of claim 2, the tool further comprising:
    a composite member disposed about the mandrel and in engagement with the seal element, wherein the composite member is made of a first material and comprises a first portion and a second portion, and wherein the first portion comprises at least one groove.

4. The downhole tool of claim 2, the tool further comprising:
    a first cone disposed around the mandrel sleeve and proximate the seal element; and
    a bearing plate disposed around the mandrel sleeve.

5. The downhole tool of claim 2, wherein the set of threads comprise one of shear threads or rounded threads.

6. The downhole tool of claim 5, wherein at least one of the first slip and the second slip are made of composite material.

7. The downhole tool of claim 5, wherein both the first slip and the second slip are made of metal.

8. The downhole tool of claim 1, wherein the sleeve insert is made of material having a cured composition comprising:
- an epoxy system comprising an epoxy resin and a hardener; and
- a soluble medium.

9. The downhole tool of claim 1, wherein the sleeve insert is made of material having a cured composition comprising:
- a low viscosity cycloaliphatic epoxy resin with an anhydride curing agent; and
- a water-soluble fiber.

10. A downhole tool useable for isolating sections of a wellbore, the downhole tool comprising:
- a mandrel sleeve comprising:
  - a proximate end; a distal end; a length of mandrel sleeve body extending between the proximate end and the distal end; and an inner sleeve bore comprising an inner sleeve bore diameter;
- a sleeve insert threadingly engaged with an inner surface of the inner sleeve bore, and extending from the proximate end to the distal end;
- a first slip disposed about the mandrel, the first slip further comprising a circular slip body;
- a second slip disposed about the mandrel;
- a lower sleeve disposed about the mandrel and proximate to the second slip; and
- a seal element,
- wherein the sleeve insert is configured with an insert sleeve bore that extends from a first insert end to a second insert end, wherein the insert sleeve bore comprises an inner insert bore diameter, wherein the inner insert bore diameter is smaller than the inner sleeve bore diameter, and wherein the sleeve insert is configured with a ball seat.

11. The downhole tool of claim 10, wherein the sleeve insert is made of material having a composition comprising:
- an epoxy system comprising an epoxy resin and a hardener; and
- a soluble medium.

12. The downhole tool of claim 10, wherein the sleeve insert is made of material having a composition comprising:
- a low viscosity cycloaliphatic epoxy resin with an anhydride curing agent; and
- a water-soluble fiber.

13. The downhole tool of claim 10, wherein at least one component of the downhole tool is made of material having a cured composition comprising:
- an epoxy system comprising an epoxy resin and a hardener; and
- a soluble medium.

14. The downhole tool of claim 10, wherein at least one component of the downhole tool is made of material having a cured composition comprising:
- a low viscosity cycloaliphatic epoxy resin with an anhydride curing agent; and
- a water-soluble fiber.

15. The downhole tool of claim 14, the downhole tool further comprising:
- a first cone disposed around the mandrel sleeve and proximate the seal element; and
- a bearing plate disposed around the mandrel sleeve.

16. The downhole tool of claim 10, wherein the mandrel sleeve further comprises at least one of a set of shear threads and a set of rounded threads.

17. A method of setting a downhole tool in order to isolate one or more sections of a wellbore, the method comprising:
- running the downhole tool into the wellbore to a desired position, the downhole tool comprising:
  - a mandrel sleeve comprising: a proximate end; a distal end; a length of mandrel sleeve body extending between the proximate end and the distal end, also with an inner sleeve bore extending between the proximate end and the distal end; and an outer surface;
  - a sleeve insert disposed within the mandrel sleeve, and threadingly engaged with the inner sleeve bore at the distal end;
  - a slip disposed about the mandrel sleeve;
  - a lower sleeve threadingly engaged with the mandrel sleeve with the outer surface at the distal end;
- placing the downhole tool under a load that causes the slip to expand outwardly into at least partial engagement with a surrounding tubular;
- disconnecting the downhole tool from a setting device coupled therewith when the tensile load is sufficient to cause separation of the downhole tool from the setting device;
- performing a downhole operation;
- dissolving the sleeve insert; and
- after dissolving the sleeve insert, producing a fluid to a surface facility through the inner bore;
- wherein the inner sleeve bore comprises an inner sleeve bore diameter, wherein the sleeve insert is configured with an insert sleeve bore that extends from a first insert end to a second insert end, wherein the insert sleeve bore comprises an inner insert bore diameter, and wherein the inner insert bore diameter is smaller than the inner sleeve bore diameter.

18. The method of claim 17, wherein at least one component of the downhole tool is made of material having a cured composition comprising:
- an epoxy system comprising an epoxy resin and a hardener; and
- a soluble medium,
- wherein the sleeve insert is configured with a ball seat.

19. The method of claim 17, wherein at least one component of the downhole tool is made of material having a cured composition comprising:
- a low viscosity cycloaliphatic epoxy resin with an anhydride curing agent; and
- a water-soluble fiber.

20. A downhole tool suitable for use in a wellbore, the tool comprising:
- a mandrel sleeve comprising:
  - a proximate end; a distal end; a length of mandrel sleeve body extending between the proximate end and the distal end; and an inner sleeve bore comprising an inner sleeve bore diameter;
- a sleeve insert disposed within the mandrel sleeve, and extending between the proximate end and the distal end, the sleeve insert further comprising:
  - a first insert end; a second insert end; an insert sleeve bore that extends from the first insert end to the second insert end; and a ball seat;
- a first slip disposed about the mandrel sleeve;
- a second slip disposed about the mandrel sleeve;
- a seal element disposed between the first slip and the second slip; and
- a lower sleeve disposed about the mandrel sleeve proximate to the second slip, and threadingly engaged with the distal end of the mandrel sleeve, wherein at least a portion of the sleeve insert is positioned radially laterally proximate to the seal element, wherein the insert sleeve bore comprises an inner insert bore diameter, and wherein the inner insert bore diameter is smaller than the inner sleeve bore diameter.

\* \* \* \* \*